(12) United States Patent  
Zieske et al.

(10) Patent No.: US 7,160,954 B2  
(45) Date of Patent: Jan. 9, 2007

(54) GOLF BALL COMPOSITIONS NEUTRALIZED WITH AMMONIUM-BASED AND AMINE-BASED COMPOUNDS

(75) Inventors: Nathan Zieske, Mattapoisett, MA (US); Murali Rajagopalan, South Dartmouth, MA (US); David A. Bulpett, Boston, MA (US)

(73) Assignee: Acushnet Company, Fairhaven, MA (US)

(*) Notice: Subject to any disclaimer, the term of this patent is extended or adjusted under 35 U.S.C. 154(b) by 0 days.

(21) Appl. No.: 10/875,725

(22) Filed: Jun. 25, 2004

(65) Prior Publication Data

US 2005/0288446 A1    Dec. 29, 2005

(51) Int. Cl.  
A63B 37/12    (2006.01)  
A63B 37/00    (2006.01)  
C08F 20/06    (2006.01)

(52) U.S. Cl. .................... 525/329.9; 473/371; 473/374; 473/378

(58) Field of Classification Search .............. None  
See application file for complete search history.

(56) References Cited

U.S. PATENT DOCUMENTS

| | | | |
|---|---|---|---|
| 3,264,272 A | 8/1966 | Rees | 260/78.5 |
| 3,404,134 A | 10/1968 | Rees | 260/78.5 |
| 4,274,637 A | 6/1981 | Molitor | 273/235 R |
| 4,473,665 A | 9/1984 | Martini-Vvedensky et al. | 521/79 |
| 4,560,168 A | 12/1985 | Aoyama | 273/232 |
| 4,925,193 A | 5/1990 | Melvin et al. | 273/232 |
| 4,960,281 A | 10/1990 | Aoyama | 273/232 |
| 5,006,297 A | 4/1991 | Brown et al. | 264/234 |
| 5,160,674 A | 11/1992 | Colton et al. | 264/50 |
| 5,248,878 A | 9/1993 | Ihara | 219/121.69 |
| 5,249,804 A | 10/1993 | Sanchez | 273/232 |
| 5,316,730 A | 5/1994 | Blake et al. | 422/73 |
| 5,334,673 A | 8/1994 | Wu | 273/235 R |
| 5,484,870 A | 1/1996 | Wu | 528/28 |
| 5,516,847 A * | 5/1996 | Sullivan et al. | 525/221 |
| 5,562,552 A | 10/1996 | Thurman | 473/379 |
| 5,575,477 A | 11/1996 | Hwang | 473/379 |
| 5,688,191 A | 11/1997 | Cavallaro et al. | 473/373 |
| 5,713,801 A | 2/1998 | Aoyama | 473/354 |
| 5,733,428 A | 3/1998 | Calabria et al. | 264/134 |
| 5,803,831 A | 9/1998 | Sullivan et al. | 473/374 |
| 5,820,488 A | 10/1998 | Sullivan et al. | 473/374 |
| 5,849,168 A | 12/1998 | Lutz | 264/755 |
| 5,885,172 A | 3/1999 | Hebert et al. | 473/354 |
| 5,919,100 A | 7/1999 | Boehm et al. | 473/354 |
| 5,919,862 A * | 7/1999 | Rajagopalan | 525/63 |
| 5,957,787 A | 9/1999 | Hwang | 473/379 |
| 5,965,669 A | 10/1999 | Cavallaro et al. | 525/221 |
| 5,981,654 A | 11/1999 | Rajagopalan | 525/66 |
| 5,981,658 A | 11/1999 | Rajagopalan et al. | 525/72 |
| 6,037,419 A * | 3/2000 | Takesue et al. | 525/329.9 |
| 6,056,842 A | 5/2000 | Dalton et al. | 156/243 |
| 6,075,223 A | 6/2000 | Harrison | 219/121.85 |
| 6,099,415 A | 8/2000 | Lutz | 473/357 |
| 6,129,881 A | 10/2000 | Puniello | 264/278 |
| 6,149,535 A | 11/2000 | Bissonnette et al. | 473/354 |
| 6,180,040 B1 | 1/2001 | Ladd et al. | 264/248 |
| 6,180,722 B1 | 1/2001 | Dalton et al. | 525/193 |
| 6,207,784 B1 | 3/2001 | Rajagopalan | 528/71 |
| 6,213,898 B1 | 4/2001 | Ogg | 473/383 |
| 6,235,230 B1 | 5/2001 | Puniello | 264/278 |
| 6,241,622 B1 | 6/2001 | Gobush et al. | 473/199 |
| 6,245,862 B1 * | 6/2001 | Rajagopalan | 525/340 |
| 6,248,804 B1 | 6/2001 | Lutz | 523/160 |
| 6,286,364 B1 | 9/2001 | Aoyama et al. | 73/65.03 |
| 6,290,615 B1 | 9/2001 | Ogg | 473/378 |
| 6,315,915 B1 | 11/2001 | Hebert et al. | 216/67 |
| 6,329,458 B1 | 12/2001 | Takesue et al. | 524/400 |
| 6,338,684 B1 | 1/2002 | Winfield et al. | 473/378 |
| 6,358,161 B1 | 3/2002 | Aoyama | 473/383 |
| 6,379,138 B1 | 4/2002 | Puniello et al. | 425/116 |
| 6,383,092 B1 | 5/2002 | Ogg | 473/378 |
| 6,391,955 B1 | 5/2002 | Rajagopalan et al. | 524/308 |
| 6,409,615 B1 | 6/2002 | McGuire et al. | 473/383 |
| 6,414,082 B1 | 7/2002 | Rajagopalan et al. | 525/74 |
| 6,462,303 B1 | 10/2002 | Brown | 219/121.69 |
| 6,484,870 B1 | 11/2002 | Bohnker et al. | 198/626.2 |
| 6,486,250 B1 | 11/2002 | Rajagopalan | 524/431 |
| 6,488,591 B1 | 12/2002 | Gobush et al. | 473/199 |
| 6,500,073 B1 | 12/2002 | Gobush et al. | 473/199 |
| 6,500,495 B1 | 12/2002 | Lutz | 427/500 |
| 6,653,382 B1 | 11/2003 | Statz et al. | 524/400 |
| 2001/0009310 A1 | 7/2001 | Herbert et al. | |
| 2001/0018375 A1 | 8/2001 | Hayashi et al. | |
| 2001/0019971 A1 | 9/2001 | Hayashi et al. | |

(Continued)

FOREIGN PATENT DOCUMENTS

WO    WO 00/23519    10/1999

(Continued)

OTHER PUBLICATIONS

U.S. Appl. No. 10/228,311 filed Aug. 27, 2002 entitled "Golf Balls Comprising Light Stable Materials and Methods for Making Same".

(Continued)

*Primary Examiner*—David J. Buttner  
(74) *Attorney, Agent, or Firm*—Bingham McCutchen LLP

(57) ABSTRACT

The present invention is directed to a golf ball and to a process for forming a golf ball having at least one layer, where the layer is formed of an ionomer composition having greater than about 70 percent of the acid groups neutralized by a neutralizing component including ammonium salts, monoamine salts, or a combination thereof.

37 Claims, 2 Drawing Sheets

U.S. PATENT DOCUMENTS

| | | |
|---|---|---|
| 2002/0025862 A1 | 2/2002 | Sullivan et al. |
| 2002/0028885 A1 | 3/2002 | Sullivan et al. |
| 2002/0037968 A1 | 3/2002 | Chen |
| 2002/0079615 A1 | 6/2002 | Puniello et al. |
| 2002/0082358 A1 | 6/2002 | Ohira et al. |
| 2002/0091188 A1 | 7/2002 | Statz et al. |
| 2003/0013549 A1 | 1/2003 | Rajagopalan et al. |
| 2003/0050373 A1 | 3/2003 | Chen |
| 2003/0096936 A1 | 5/2003 | Wu et al. |
| 2003/0106442 A1 | 6/2003 | Gosetti |
| 2003/0114565 A1 | 6/2003 | Chen et al. |
| 2003/0119989 A1 | 6/2003 | Ladd et al. |
| 2003/0130434 A1 | 7/2003 | Statz et al. |
| 2003/0144082 A1 | 7/2003 | Rajagopalan et al. |
| 2003/0158001 A1 | 8/2003 | Morgan et al. |
| 2003/0158352 A1 | 8/2003 | Rajagopalan et al. |
| 2003/0181260 A1 | 9/2003 | Rajagopalan et al. |
| 2003/0181595 A1 | 9/2003 | Chen |
| 2003/0212240 A1 | 11/2003 | Wu et al. |

FOREIGN PATENT DOCUMENTS

| | | |
|---|---|---|
| WO | WO 01/29129 | 10/2000 |

OTHER PUBLICATIONS

U.S. Appl. No. 10/190,705 filed Jul. 9, 2002, entitled "Low Compression, Resilient Golf Balls with Rubber Core".

U.S. Appl. No. 10/167,744 filed Jun. 13, 2002, entitled "Golf Ball With Multiple Cover Layers".

U.S. Appl. No. 10/138,304 filed May 6, 2002 entitled "Golf Ball Incorporating Grafted Metallocene Catalyzed Polymer Blends".

U.S. Appl. No. 10/028,826 filed Dec. 28, 2001 entitled "Golf Ball With A Radially Oriented Transversely Isotropic Layer and Manufacture of Same".

U.S. Appl. No. 09/989,191 filed Nov. 21, 2001 entitled "Golf Ball Dimples with a Catenary Curve Profile".

U.S. Appl. No. 09/842,829 filed Apr. 27, 2001 entitled "All Rubber Golf Ball With Hoop-Stress Layer".

U.S. Appl. No. 09/841,910 filed Apr. 27, 2001 entitled "Multilayer Golf Ball With Hoop-Stress Layer".

U.S. Appl. No. 09/717,136 filed Nov. 22, 2000 entitled "Method of Making Golf Balls".

U.S. Appl. No. 09/442,845 filed Nov. 18, 1999 entitled "Mold For a Golf Ball".

\* cited by examiner

GOLF BALL COMPOSITIONS NEUTRALIZED WITH AMMONIUM-BASED AND AMINE-BASED COMPOUNDS

FIELD OF THE INVENTION

The present invention relates to ammonium-neutralized or amine-neutralized thermoplastic compositions that are easily melt processable and have good adhesion characteristics for use in golf ball components.

BACKGROUND OF THE INVENTION

Golf ball manufacturers have been using ionomer resins for golf ball component materials because of their durability, rebound, and scuff resistance characteristics. Ionomer resins are generally understood as thermoplastic polymers that are ionically crosslinked, and which may contain both hydrogen and ionic bonds. Ionomers are typically derived from copolymers of an olefin, e.g., ethylene, and an $\alpha,\beta$-unsaturated carboxylic acid, e.g., acrylic acid, methacrylic acid, or maleic acid, that are partially neutralized with metal ions such as sodium, lithium, zinc, or magnesium ions, as disclosed in U.S. Pat. Nos. 3,264,272 and 3,404,134. Examples of commercially available ionomer resins include, but are not limited to, SURLYN® from DuPont de Nemours and Company, and ESCORT® and IOTEK® from Exxon Corporation. These ionomer resins are distinguished by the type of metal ion, the amount of acid, and the degree of neutralization.

Those of ordinary skill in the art are aware that increasing the neutralization of ethylene-based ionomers during manufacturing reduces the processability of the material. This is demonstrated by the decreased melt flow index of the resulting material, which can be measured according to ASTM method D-1238, procedure A using a 2.16 kg weight. In fact, in some cases, the melt flow index of the material is decreased to the point that the material does not flow at all under normal processing conditions. Once the neutralization is greater than about 60 percent, depending upon the cation(s) present, the melt flow of the ionomer is too low to easily process the material. And, in some cases, e.g., trivalent cations, the threshold percent for non-processability of the material is much lower than about 60 percent. As a result, commercially available ethylene-based ionomers are generally only partially neutralized.

And, while certain highly neutralized polymers have recently been discussed in U.S. Pat. No. 6,329,458, U.S. Patent Publication Nos. 2001/0019971 and 2001/0018375, and International Publication No. WO 01/29129, these polymers are produced using organic fatty acid salts. Potential compatibility issues remain with these fatty acid-based highly neutralized polymers, however, due to their hydrophobic backbone moiety. In addition, the fatty acids may, depending on molecular weight and/or boiling point, vaporize during injection molding, generating a large amount of gas, which may lead to molding defects. The presence of this gas may also result in gas constituents settling on the surface of the molded object, which greatly lowers the adhesiveness of the object to paint, additional layers, or the like.

In addition, the recent trend toward light stable cover materials has introduced durability and adhesion issues, particularly between an ionomer resin inner cover layer and a polyurethane outer cover layer. For example, the inner components of most commercially available polyurethane covered or layered golf balls undergo a surface treatment, e.g., corona discharge/silane dipping, to overcome the adhesion problems. The surface treatment, however, adds cost and time to the manufacturing process.

Thus, a need exists in the golf ball art for a resin material that is easily processed with desirable melt flow and molding characteristics. In addition, a need exists for improved cover layer materials that reduce or eliminate adhesion problems with other cover layer materials. Moreover, a need exists in the art for a method to mold this material into highly durable, resilient golf balls tailorable to have virtually any combination of feel and spin rate.

SUMMARY OF THE INVENTION

The present invention is directed to compositions that may be useful in one or more layers of a golf ball. One embodiment of the invention is a golf ball having a composition that is formed at least partially from a thermoplastic resin component having an acid group and a neutralizing component. The neutralizing component may include an amine salt, an ammonium salt, or a mixture thereof.

In a preferred embodiment, however, the neutralizing component comprises an ammounium salt. Even more preferably, the ammonium salt comprises at least one quaternary ammonium compound, such as tetramethylammonium hydroxide, tetramethylammonium hydroxide, or ammonium hydroxide.

The neutralizing component may be present in amounts to fully netralize, highly neutralize, or partially neutralize the acid groups of the thermoplastic resin. The degree of neutralization of the acid group by the neutralizing component may vary. For example, the neutralizing component may neutralize about 10 percent or greater of the acid group. The neutralizing component also may neutralize even greater amounts of the acid group, such as neutralizing about 30 percent or greater, about 50 percent or greater, or about 80 percent or greater of the acid group. In some embodiments, the neutralizing component may neutralize about 90 percent or greater of the acid group, or even may neutralize about 100 percent of the acid group. The acid groups of the thermoplastic resin also may be at least partially neutralized in other ways in addition to the neutralizing component. For instance, the acid group may be at least partially neutralized with a metal ion.

In addition, the degree to which the acid group of the composition is neutralized also can vary. For example, the composition used in forming a layer of a golf ball may have acid groups that are only partially neutralized. In other embodiments, the acid group may be highly or fully neutralized. Thus, the present invention does not require that the entirety of the acid group is neutralized in every instance.

In some embodiments, the composition may be blended with a polymer. For example, the composition may be blended with saponified polymers, graft copolymers of saponified polymers, oxa esters and oxa acids, block copolymers of a poly(ether-ester), block copolymers of a poly(ether-amide), styrene-butadiene-styrene block copolymers, styrene-(ethylene-propylene)-styrene or styrene-(ethylene-butylene)-styrene block copolymers, olefinic copolymers, metallocene catalyzed polymers, ethylene-alpha olefin copolymers, terpolymers made from metallocene catalysts, block poly(urethane-ester) or block poly(urethane-ether) or block poly(urethane-caprolactone), polyethylene glycol, polycaprolactone, polycaprolactam, polyesters, polyamides, ethylene-propylene-(diene monomer) terpolymers and their sulfonated or carboxylated derivatives, PP/EPDM and dynamically vulcanized rubbers. In some blends, the composition may comprise about 25 percent or greater of the combination of materials, while in other embodiments the composition may comprise 50 percent or more, or even 75 percent or more of the blend. Some of the materials that may be blended with the composition may be thermoplastic, while others may be thermoset. In some embodiments, the composition may be blended with rubber materials.

In one embodiment, the acid group may be present in the thermoplastic resin material in an amount from about 5 percent to about 35 percent by weight of the thermoplastic resin component, while in another embodiment the acid group is present in amounts from about 8 percent to about 25 percent.

Golf balls comprising compositions of the present invention may have multiple core layers, intermediate layers, or cover layers. For example, in one embodiment of the invention, the golf ball has a core with an outer diameter of 1.51 inches or greater, or even 1.54 inches or greater. Likewise, the core may have an inner core layer and an outer core layer. In one embodiment, the inner core layer has a diameter of from about 0.5 inches to about 1.2 inches, while the outer core layer may be from about 0.1 to about 0.59 inches thick. In another embodiment, the outer core layer may be from about 0.1 to about 0.8 inches thick. The golf ball also may have one or more intermediate layers and a cover. For example, in one embodiment, the golf ball has an intermediate layer that is from about 0.01 to about 0.1 inches thick and a cover that is about 0.07 inches thick or less.

The compositions of the present invention may be used in any golf ball layer. In a preferred embodiment, however, the composition may be used in an intermediate layer. The intermediate layer may have a flexural modulus of about 5,000 psi to about 100,000 psi, although not every embodiment is limited to this range. In other embodiments, the intermediate layer may have a flexural modulus of about 25,000 psi to about 75,000 psi. Another property of the intermediate layer that may vary is its hardness. For example, the hardness of the intermediate layer may be from about 30 Shore D to about 70 Shore D.

In some embodiments of the invention, the cover of the golf ball may be made of polyurethane, polyurea, or mixtures thereof. The cover may be made of a thermoplastic materials that may be molded onto the ball in a variety of ways, including injection molding, compression molding, or the like. Thermoset materials also may be used to form the cover of the ball. In one embodiment, a thin thermoset material is cast over the golf ball.

DETAILED DESCRIPTION OF THE INVENTION

Figure 1:
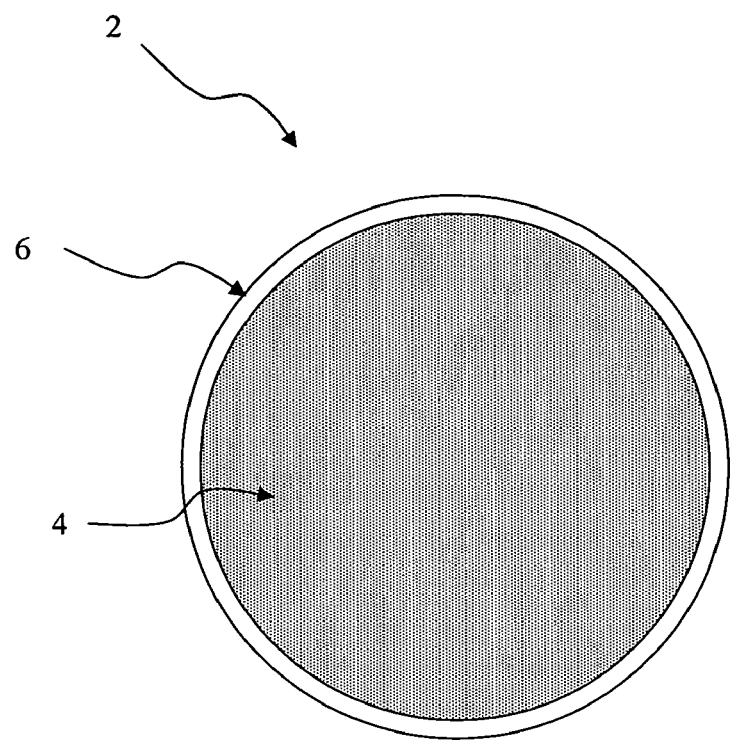
FIG. 1 is a cross-sectional view of a two layer ball, wherein at least a portion of the golf ball is formed from the compositions of the invention.

The present invention is directed to neutralized polymer compositions for forming one or more layers of a golf ball. Unlike conventional polymers, the compositions may be ammonium-neutralized compositions, amine-neutralized compositions, or compositions that have been neutralized to some degree with ammonium-based components and amine-based components. The neutralization produces compositions that are easily melt processable and are believed to have good adhesion characteristics.

Some embodiments of the invention are directed toward a variety of thermoplastic ammonium-neutralized or amine-neutralized compositions having desired processability and adhesion characteristics. For instance, some compositions of the invention may be formed from an acid copolymer having the following general formula:

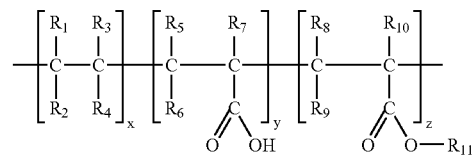

where $R_1$–$R_6$ and $R_8$–$R_9$ may be hydrogen, a brached or linear alkyl group, carbocylic group, aromatic group, or heterocyclic group, where $R_7$ and $R_{11}$ may be hydrogen or a lower alkyl group, where $R_{11}$ may be any linear or branched alkyl group, preferably methyl, ethyl, propyl, butyl, pentyl, hexyl, hectyl, octyl, or isobornyl, and where x is preferably from 50 to 99 weight percent, where y is preferably 1 to 50 weight percent, and where z is preferably 0 to 50 weight percent. Thus, the term acid copolymer in this application means two or more monomers of x, y, or z above. More specifically, "acid copolymers" include copolymers of an olefin and an α,β-unsaturated carboxylic acid. The degree of neutralization may vary, for instance it may be partially, highly, or fully neutralized according to this process.

As mentioned above, and explained in greater detail below, the acid copolymer also may be neutralized in one or more of several ways. And, the degree to which the polymer compositions of the invention are neutralized may vary. For example, on a continuum of neutralization, a partially neutralized polymer of the present invention is neutralized to a lesser degree than a highly neutralized polymer, and a highly neutralized polymer is neutralized to a lesser degree than a fully neutralized polymer. As used herein, the term highly neutralized polymer is intended to cover those polymers having greater than about 70 percent of the acid groups neutralized. In one embodiment, about 80 percent or greater of the acid groups are neutralized. In another embodiment, about 90 percent or greater of the acid groups are neutralized. In still another embodiment, all of the acid groups (100 percent) in the polymer composition are neutralized, i.e., the composition is "fully neutralized".

As such, compositions of the present invention may be formed from an acid copolymer that is partially, highly, or fully neutralized by one or more amine-based or an ammonium-based components, or mixtures thereof. For example, partially, highly, or fully neutralized compositions of the present invention may be formed by adding amine or ammonium salts (or derivatives thereof) to an acid copolymer, a traditional partially neutralized ionomer, or a combination thereof. As used herein, the term "traditional partially neutralized ionomers" refers to the salts of acid copolymers formed by neutralizing a portion, i.e., less than about 70 percent, of the carboxylic acid groups on the polymer with at least one metal atom, such as lithium, sodium, potassium, cesium, magnesium, calcium, barium, zinc, manganese, copper, and aluminum. The copolymeric materials may also have a softening monomer, such as an acrylate class ester.

A composition that is only partially or highly neutralized in the manner described above may be subjected to additional neutralization using more traditional processes, e.g., neutralization with salts of organic fatty acids and a suitable cation source. In addition, compositions of the present invention may involve a blend of neutralized copolymers. For example, the blend may include a first copolymer that has been neutralized with amine-based or ammonium-based components according to the present invention and a second copolymer that has been neutralized in a more traditional manner. In addition, the present invention contemplates blends of copolymers neutralized with amine-based or ammonium-based components according to the invention with conventional ionomers in any state of naturalization. Finally, copolymers that have been partially or highly neutralized using conventional methods may be further neutralized using amine-based or ammonium-based components, or both.

Because the compositions of the invention advantageously retain good melt flow properties without the use of additives, such as metal salts of fatty acids, the compositions are adaptable to most molding methods and, as such, are useful in any layer of a golf ball. For example, the partially, highly, or fully neutralized compositions of the present invention may be useful in golf ball intermediate layers and outer cover layers, as well the innermost components of golf balls, such as core layers.

In addition, the highly neutralized ionomer compositions may reduce or eliminate the adhesion problems typically encountered when using an ionomeric material in one layer and a light stable material in a surrounding layer. As such, the compositions of the invention may be useful as an intermediate layer or inner cover layer with a light stable polyurethane or polyurea cover disposed thereon.

Compositions of the Invention

As briefly discussed above, the neutralized ionomer compositions of the present invention may be formed from an acid copolymer and an amine salt, an ammonium salt, or mixtures thereof. In addition, the amine salt, ammonium salt, or mixture thereof may be added to a traditional partially neutralized ionomer to create a highly or fully neutralized ionomer of the present invention. Moreover, the amine and/or ammonium salt may be added to a mixture of acid copolymer and partially neutralized ionomer to form highly neutralized ionomer compositions of the present invention. Several variations of neutralization of compositions are possible, some of which are described in detail below to further illustrate the invention.

Neutralization with Amine-Based or Ammonium-Based Components

As discussed above, one method of obtaining a neutralized polymer composition of the present invention is to add an amine-based or ammonium-based neutralizing agent or mixtures thereof. Examples of these neutralizing agents include, but are not limited to, ammonium-based components, salts of ammonium-based components, amine-based components, and salts of amine-based components.

For example, a highly neutralized composition of the invention may be formed by adding primary, secondary, or tertiary ammonium-based compounds (or derivatives thereof) to an acid copolymer, partially neutralized ionomer, or a mixture thereof having the following general formulae:

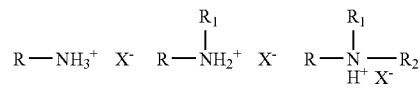

where R, $R_1$, and $R_2$ may be hydrogen, any linear or branched alkyl group having from about 1 to about 50 carbon atoms, preferably about 1 to about 30 carbon atoms, or from about 1 to about 12 carbon atoms, aryl group, phenyl group, a cyclic group, or mixture thereof, and $X^-$ is selected from halide, hydroxide, carboxylate, and other suitable anionic moieties. The organic groups R, $R_1$, and $R_2$ may be the same or different from each other.

In addition, the compositions of the invention may be formed by adding monoammonium salt (or derivative thereof) or diammonium salt, i.e., containing $R_3NH^+$, to an acid copolymer, partially neutralized ionomer, or mixture thereof. One example of an ammonium salt is a quaternary ammonium salt having the following general formula:

where R is any alkyl group, and wherein $X^-$ may be any one of fluoride, chloride, bromide, iodide, hydroxide, carbonate, other suitable anionic moiety or mixtures thereof. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, butylene, pentene, hexene, heptene, octene, norbornene, nonene, decene and the like. In addition, such alkyl groups may also contain various substituents in which one or more hydrogen atoms has been replaced by a functional group. Functional groups include, but are not limited to, hydroxyl, amino, carboxyl, sulfonic amide, ester, ether, phosphate, thiol, nitro, silyl, and halogen (fluorine, chlorine, bromine and iodine).

The synthesis of quaternary ammonium salt should be known to those of ordinary skill in the art. For example, an amine can react with an alkyl halide, producing an amine of the next higher class, wherein one of the hydrogens attached to nitrogen has been replaced by an alkyl group, which eventually produces an ammonium salt. The general reaction scheme is demonstrated below:

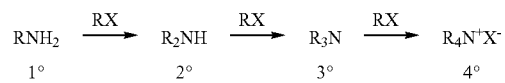

In one embodiment, the quaternary ammonium salt is a tetraalkyl ammonium hydroxide, which has the following general formula:

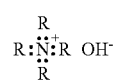

where R is any alkyl or aryl group. Non-limiting examples of quaternary ammonium hydroxides include tetraalkylammonium hydroxides such as tetramethylammonium hydroxide, tetraethylammonium hydroxide, tetra-n-propylammonium hydroxide, tetra-n-butylammonium hydroxide, tetra-n-hexylammonium hydroxide, tetra-n-octylammonium hydroxide, and tetra-n-decylammonium hydroxide.

A generic reaction scheme for neutralization of an acid copolymer with an ammonium-based component according to the present invention is as follows:

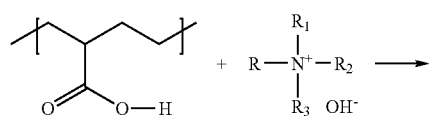

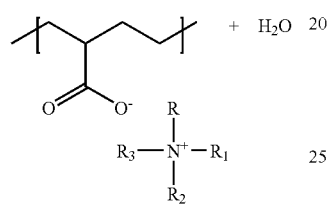

where R, $R_1$, $R_2$, and $R_3$ may be hydrogen, any linear or branched alkyl group having from about 1 to about 50 carbon atoms, preferably about 1 to about 20 carbon atoms, or from about 1 to about 12 carbon atoms, aryl group, phenyl group, a cyclic group, or mixture thereof. The organic groups R, $R_1$, $R_2$, and $R_3$ may be the same or different from each other.

The generic reaction scheme for neutralization involving a monoammonium salt is as follows:

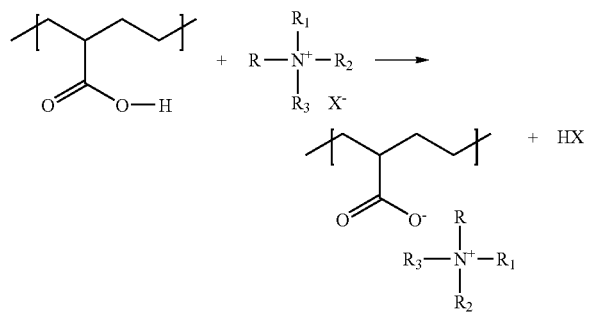

where R, $R_1$, $R_2$, and $R_3$ may be hydrogen, any linear or branched alkyl group having from about 1 to about 50 carbon atoms, preferably about 1 to about 20 carbon atoms, or from about 1 to about 12 carbon atoms, aryl group, phenyl group, a cyclic group, or mixture thereof, and where X— may be any one of fluoride, chloride, bromide, iodide, hydroxide, and mixtures thereof. The organic groups R, $R_1$, $R_2$, and $R_3$ may be the same or different from each other.

Likewise, the generic reaction scheme for neutralization involving a diammonium salt is as follows:

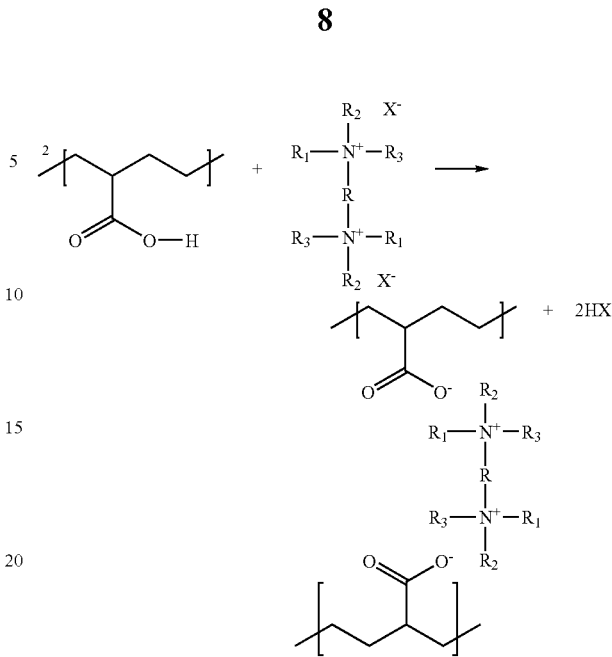

where R may be any linear or branched alkyl group, i.e., any $(CH_2)_n$ group, cycloalkyl group, aryl group, carboxylic group, aromatic group, heterocyclic group, or mixture thereof, where $R_1$, $R_2$, and $R_3$ may be hydrogen, any linear or branched alkyl group having from about 1 to about 50 carbon atoms, preferably about 1 to about 20 carbon atoms, or from about 1 to about 12 carbon atoms, aryl group, phenyl group, a cyclic group, or mixture thereof, and where $X^-$ may be any one of fluoride, chloride, bromide, iodide, hydroxide, carbonate, other suitable anionic moiety and mixtures thereof. The organic groups $R_1$, $R_2$, and $R_3$ may be the same or different from each other.

A variety of amine-based neutralizing agents may also be used in compositions of the present invention. For example, a highly neutralized ionomer composition may be formed by adding an amine-based component (or derivatives thereof) to an acid copolymer, partially neutralized ionomer, or a mixture thereof. In general, an amine-based component according to the present invention include primary amines, secondary amines, tertiary amines having one of the following general formulae:

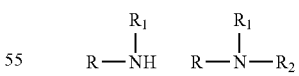

where R, $R_1$, and $R_2$ may be hydrogen, any linear or branched alkyl group having from about 1 to about 50 carbon atoms, preferably about 1 to about 30 carbon atoms, or from about 1 to about 12 carbon atoms, aryl group, phenyl group, a cyclic group, or mixture thereof. The organic groups R, $R_1$, and $R_2$ may be the same or different from each other.

An example of an amine-based component contemplated for use as a neutralizing agent of the present invention is a monoamine, i.e., an organic compound containing a single amino group. Skilled artisans understand and are aware of methods of forming monoamine salts that may be used in compositions of the present invention. For example, monoamines may be formed by the reaction of a monohydric alcohol initiator with ethylene and/or propylene oxide, followed by the conversion of the resulting terminal hydroxyl group to an amine, yielding the following generic structure:

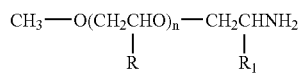

wherein R and $R_1$ may be hydrogen or methyl groups, and n is preferably tailored so that the overall ethylene oxide/propylene oxide ratio of the molecule is about 70 to 30. A non-limiting commercially available example of such a monoamine includes JEFFAMINE® M-2070, which has the following structure:

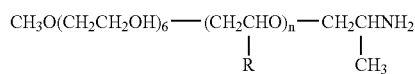

wherein R may be a hydrogen or a methyl group, and n is tailored so that the overall ethylene oxide/propylene oxide ratio of the molecule is about 70 to 30.

Generic reaction schemes for neutralization of an acid copolymer with an amine-based component according to the present invention include the following:

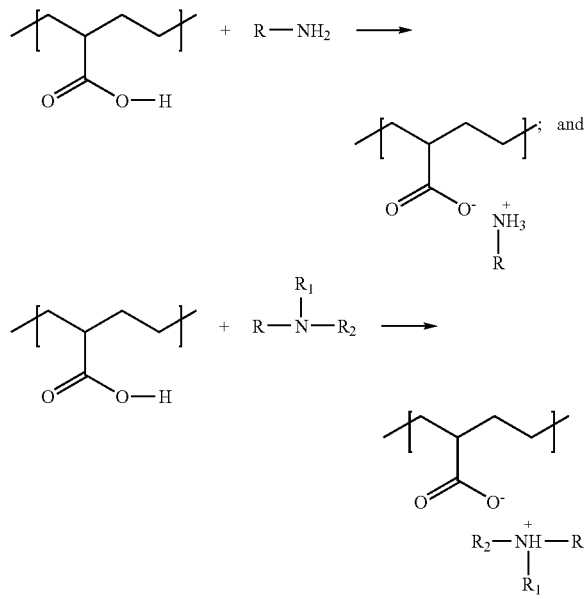

where R, $R_1$, $R_2$, and $R_3$ may be hydrogen, any linear or branched alkyl group having from about 1 to about 50 carbon atoms, preferably about 1 to about 30 carbon atoms, or from about 1 to about 12 carbon atoms, aryl group, phenyl group, a cyclic group, or mixture thereof. The organic groups R, $R_1$, and $R_2$ may be the same or different from each other.

Primary, secondary, and tertiary amine salts are also contemplated for use as neutralizing agents according to the invention. For example, monoamine salts may then be readily formed by reacting a monoamine with a variety of organic and inorganic acids. The general reaction scheme is shown below:

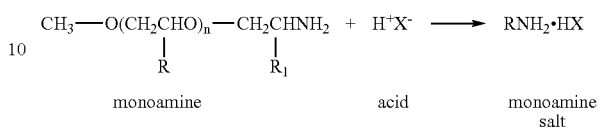

wherein R and $R_1$ are hydrogen or methyl groups, n is preferably tailored so that the overall ethylene oxide/propylene oxide ratio of the molecule is about 70 to 30, and $X^-$ may be may be any one of fluoride, chloride, bromide, iodide, hydroxide, and mixtures thereof.

One possible generic reaction scheme for neutralization of an acid copolymer with an amine salt according to the present invention is as follows:

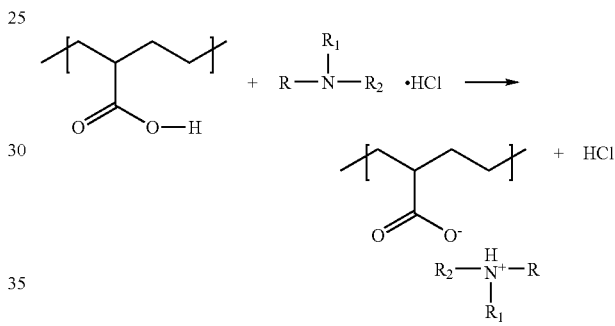

where R, $R_1$, $R_2$, and $R_3$ may be hydrogen, any linear or branched alkyl group having from about 1 to about 50 carbon atoms, preferably about 1 to about 20 carbon atoms, or from about 1 to about 12 carbon atoms, aryl group, phenyl group, a cyclic group, or mixture thereof. The organic groups R, $R_1$, and $R_2$ may be the same or different from each other. Examples of ethylene methacrylic acid and ethylene acrylic acid copolymers and their terpolymers are sold commercially under the trade names NUCREL®, ESCOR®, or PRIMACOR®, which are manufactured by DuPont, Exxon and Dow Chemical, respectively.

The salts contemplated as neutralizing agent according to the invention may be the reaction product of an olefin having from 2 to 10 carbon atoms and an unsaturated monocarboxylic acid having 3 to 8 carbon atoms. Ethylene methacrylic acid ionomers and ethylene acrylic acid ionomers and their terpolymers are sold commercially under the trade names SURLYN® and IOTEK® which are manufactured by DuPont and Exxon, respectively.

Other examples of amine-based and ammonium-based neutralizing agents that may be used in compositions of the present invention include primary, secondary, and tertiary diamines, which have the following general formulae:

RHN—$R_1$—NHR

RHN—$R_1$—$NH_2$ $H_2N$—$R_1$—$NH_2$ where R is any linear or branched alkyl group having from about 1 to about 50 carbon atoms, preferably about 1 to about 30 carbon atoms, or from about 1 to about 12 carbon atoms, an aryl group, a phenyl group, a cyclic group, or mixture thereof, and where $R_1$ may be any linear or branched alkyl group, carboxylic group, aromatic group, heterocyclic group, or mixture thereof.

Generic reaction schemes for neutralization of an acid copolymer with a diamine according to the present invention include the following:

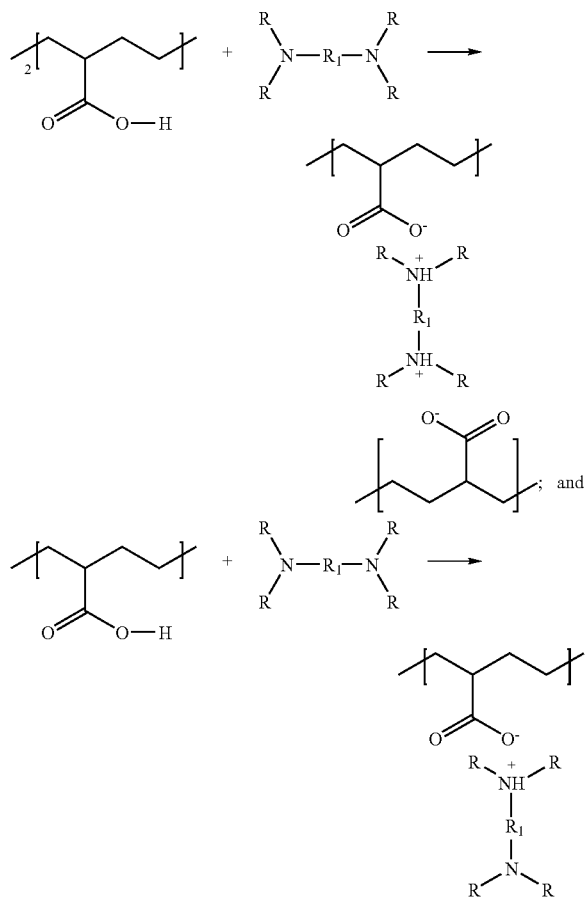

where R may be hydrogen, any linear or branched alkyl group having from about 1 to about 50 carbon atoms, preferably about 1 to about 30 carbon atoms, or from about 1 to about 12 carbon atoms, aryl group, phenyl group, a cyclic group, or mixture thereof, and where $R_1$ may be any linear or branched alkyl group, i.e., any $(CH_2)_n$ group, cycloalkyl group, aryl group, carboxylic group, aromatic group, heterocyclic group, or mixture thereof. The organic groups R, $R_1$, and $R_2$ may be the same or different from each other.

Further Neutralization of Partially Neutralized Polymers

It should be noted that any acid copolymer may be used with the amine-based or ammonium-based components to form a highly or fully neutralized composition of the invention. For example, suitable acid copolymers may include olefin-unsaturated carboxylic acid random copolymer, any olefin-unsaturated carboxylic acid-unsaturated carboxylate ternary copolymer, and mixtures thereof. In one embodiment, a monoamine or ammonium salt is mixed with an ionic copolymer or terpolymer of ethylene based on an α,β-unsaturated carboxylic acid, such as acrylic acid or methacrylic acid. The carboxylic acid groups may also include methacrylic, crotonic, maleic, fumaric or itaconic acid. Skilled artisans would appreciate that these examples are merely illustrative of the invention and that other copolymers may also be used with the neutralizing agents discussed herein.

Furthermore, the present invention also may include partially neutralized polymers that are further neutralized with one or more amine-based or ammonium-based components or mixtures thereof. For example, any traditional partially neutralized ionomer may be further neutralized in this manner. As discussed above, acid copolymers and partially neutralized ionomers differ only in that the partially neutralized ionomers used according to the invention already have a portion of the acid groups neutralized before being further neutralized by amine-based or ammonium-based components. As generally discussed earlier, traditional partially neutralized ionomers include acid copolymers that have been neutralized by about 70 percent or less. In one embodiment, olefin-unsaturated carboxylic acid random copolymers or any olefin-unsaturated carboxylic acid-unsaturated carboxylate ternary copolymers with the acid groups neutralized by about 70 percent or less may be further neutralized with amine-based or ammonium-based components to form a highly or fully neutralized ionomer composition.

For example, a monoamine or ammonium salt may be mixed with copolymers or terpolymers of ethylene and methacrylic acid or acrylic acid at least partially neutralized to about 10 to about 70 percent with salts of zinc, sodium, lithium, magnesium, potassium, calcium, manganese, nickel or the like, to form highly neutralized or fully neutralized ionomer compositions of the present invention.

Blends of Neutralized Polymers

Highly neutralized or fully neutralized compositions of the present invention also may be produced by blending compositions that are neutralized in different ways. For instance, a blend of a copolymer that is neutralized with an amine-based or ammonium-based component may be blended with a partially, highly, or fully neutralized polymer that has been neutralized using conventional methods. Some examples highly neutralized polymers that may be blended or otherwise used with compositions of the present invention are described in U.S. Pat. No. 6,653,382, which is incorporated in its entirety herein. Additional examples of materials that may be blended or otherwise used with the present invention are described in the following published U.S. Applications, all of which are incorporated by reference in their entireties: 2003/0181260, 2003/0158352, 2003/0144082, 2003/0130434, 2003/0013549, 2002/0091188, and 2003/0181595, 2003/0114565, 2003/0050373, and 2002/0037968. Materials described in WO 04/029150, WO 00/23519, and WO 01/29129 also may be used in compositions of the present invention.

In one embodiment, the composition is highly or fully neutralized and is a blend in approximately equal amounts of a copolymer neutralized with amine-based or ammonium-based components and a copolymer neutralized in some other manner. Other blends may also be used. For example, partially neutralized polymers that have been further neutralized with an amine-based or ammonium-based neutralizing agent may be blended with any other polymer composition, such as conventionally neutralized polymers or copolymers that are at least partially neutralized with amine or ammonium-based components.

Partially, highly or fully neutralized polymers of the present invention also may be present in an amount of about 1 percent to about 99 percent by weight of the composition. In another embodiment, partially, highly or fully neutralized polymers of the present invention are present in an amount from about 25 to about 90 percent by weight of the composition. In still another embodiment, about 30 to about 85 weight percent of the composition is partially, highly or fully neutralized polymer.

In one embodiment, the acid copolymer and/or partially neutralized ionomer contain a softening comonomer. For example, the acid copolymer may be an E/X/Y terpolymer where E is ethylene, X is an acrylate or methacrylate-based softening comonomer present in about 0 to 50 weight percent, and Y is acrylic or methacrylic acid present in about 5 to 35 weight percent. In another embodiment, the acrylic or methacrylic acid is present in about 5 to 30 weight percent, more preferably 8 to 25 weight percent, and most preferably 8 to 20 weight percent. Thus, to form a partially neutralized ionomer that includes a softening comonomer, the E/X/Y terpolymer described above would be at least partially neutralized to about 70 percent with salts of zinc, sodium, lithium, magnesium, potassium, calcium, manganese, nickel or the like.

The acid copolymer or partially neutralized ionomer may also be selected from so-called "low acid" and "high acid" ionomers, as well as blends thereof. For purposes of this application, ionic copolymers including up to about 12 weight percent acid are considered "low acid" ionomers, while those greater than about 12 weight percent acid but less than about 16 weight percent acid are "medium acid" ionomers, and those having about 16 weight percent or greater acid are considered "high acid" ionomers.

It is believed that as the acid level in an ionomeric composition is reduced, the golf ball will have higher spin for a given impact. Thus, in one embodiment, the acid copolymer or partially neutralized ionomer may be one in which the acid is present in about 5 to 15 weight percent and optionally includes a softening comonomer, e.g., iso- or n-butylacrylate, to produce a softer terpolymer. The softening comonomer may be selected from the group consisting of vinyl esters of aliphatic carboxylic acids wherein the acids have 1 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like. In another embodiment, a low acid ionomeric composition is used to form a golf ball layer. In another embodiment, a golf ball layer may include a medium acid ionomer.

Compositions of the present invention also may be blends with rubber materials. Some examples of rubbers that may be blended include, without limitation, Polybutadiene (BR), Polyisoprene (IR/NR), Styrene-butadiene rubber (SBR), Ethylene propylene diene rubber (EPDM), Ethylene propylene rubber (EPM), Nitrile butadiene rubber (NBR), Polychloroprene (CR), Polyacrylic rubber (ACM), Chlorosulfonated polyethylene (CM).

In another embodiment, the acid copolymer or partially neutralized ionomer is a high acid copolymer or ionomer, which, when used in golf balls, is believed to aid in producing a golf ball with low spin rate and maximum distance. In this aspect, the acrylic or methacrylic acid is present in about 15 to about 35 weight percent, making the ionomeric material a high modulus material. In one embodiment, the high modulus material includes about 16 percent by weight of a carboxylic acid, preferably from about 17 percent to about 25 percent by weight of a carboxylic acid, more preferably from about 18.5 percent to about 21.5 percent by weight of a carboxylic acid. In some circumstances, an additional comonomer such as an acrylate ester (i.e., iso- or n-butylacrylate, etc.) can also be included to produce a softer terpolymer. The additional comonomer may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high modulus copolymer or partially neutralized ionomers include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, and the like.

While the reaction procedure is not critical, one suitable method for preparing the neutralized compositions of the invention includes mixing the monoamine and/or ammonium salt with an acid copolymer previously dissolved in a solvent. In one embodiment, an amine-based or ammonium-based component is made in concentrated form and then mixed with the acid copolymer. Another suitable method may include reacting an acid copolymer with a metal ion to partially neutralize the acid copolymer and then mixing the monoamine and/or ammonium salt with the partially neutralized ionomer. In addition, the simultaneous mixing of the acid copolymer, metal ion, and the monoamine or ammonium salt may produce the highly neutralized ionomer compositions of the invention.

The mixing step may be carried out at a temperature above the melting point of the composition to be formed. In one embodiment, the mixing step is carried out to a temperature of at least about 95° C., while in another embodiment the mixing step is carried out at a temperature of from about 95° C. to about 200° C. Selection of the temperature at which mixing occurs may depend in part upon the selected ingredients or components of the composition. Skilled artisans may understand that different mixing temperatures may be used for different compositions such as to prevent thermal degradation of the composition. For instance, excess temperature will convert the neutralized polymer to the corresponding ester.

Those of ordinary skill in the art are aware of the equipment well suited to perform such mixing. For example, heat mixing may be achieved by mixing the components in an internal mixer, such as a twin-screw extruder, a Banbury mixer, or a kneader, operating at a suitable temperature, such as from about 95° C. to about 200° C. Where various additives are to be added (as discussed below), any suitable method may be used to incorporate the additives together with the essential components. For example, the essential components and the additives are simultaneously heated and mixed. Alternatively, the essential components are premixed before the additives are added thereto and the overall composition heated and mixed.

The flexural modulus of the highly neutralized ionomer composition may be from about 5,000 psi to about 150,000 psi, preferably about 10,000 psi to about 150,000 psi. In one embodiment, the highly neutralized ionomer composition has a flexural modulus of about 25,000 psi to about 75,000 psi. In addition, the hardness of the highly neutralized ionomer composition is about 30 Shore D to about 80 Shore D. In one embodiment, the hardness is about 30 Shore D to about 70 Shore D. In another embodiment, the hardness is about 40 Shore D to about 70 Shore D.

As discussed, the highly neutralized ionomer compositions of the invention preferably have a melt flow index optimal for processability. Therefore, the highly neutralized ionomer compositions of the present invention preferably have a melt flow index of about 0.5 g/10 min or greater at a temperature of 190° C. under a load of about 2100 g, according to ASTM test D-1238. In addition, the melt flow index of the highly neutralized ionomer is preferably no greater than about 20 g/10 min, preferably about 15 g/10 min or less. In one embodiment, the melt flow index of the highly neutralized ionomer composition is about 1.0 g/10 min or greater. In yet another embodiment, the melt flow index is about 1.5 g/10 min or greater. In still another embodiment, the melt flow index is about 2 g/10 min or greater.

The specific gravity of the highly neutralized ionomer is not critical, however, preferably the specific gravity is about 0.9 or greater. In one embodiment, the specific gravity of the highly neutralized ionomer is about 1.5 or less. For example, the specific gravity of the highly neutralized ionomer may be from about 0.9 to about 1.3.

Additives

The highly neutralized ionomer compositions of the invention described above may also include various additives. For example, fillers may be added to the compositions of the invention to affect rheological and mixing properties, the specific gravity, i.e., density-modifying fillers, the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium oxide, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

In one embodiment, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those with skill in the art. The selection of such filler(s) is dependent upon the type of golf ball desired, i.e., one-piece, two-piece, multi-component, or wound, as will be more fully detailed below. In another embodiment, the filler will be inorganic, having a density of greater than 4 g/cc, and will be present in amounts between about 5 and about 65 weight percent based on the total weight of the polymer composition.

The compositions of the invention may also be foamed by the addition of the at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material. As used herein, the term "foamed" encompasses "conventional foamed" materials that have cells with an average diameter of greater than 100 μm and "microcellular" type materials, i.e. cells with an average diameter from about 0.1 to 100 μm, so that about 5 to about 30 percent void fractions and void sizes on the order of 8 μm or less have been produced. Examples of conventional foamed materials include those described in U.S. Pat. No. 4,274,637. Examples of microcellular closed cell foams include those foams disclosed in U.S. Pat. No. 4,473,665 and U.S. Pat. No. 5,160,674. In this embodiment, the polymer blend may be foamed during molding by any conventional foaming or blowing agent. Preferably, foamed layers incorporating an oxa ester or oxa ester blend have a flexural modulus of at least about 1,000 psi to about 150,000 psi.

Useful blowing or foaming agents include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; peroxides; and inorganic blowing agents such as ammonium bicarbonate and sodium bicarbonate. A gas, such as air, nitrogen, carbon dioxide, and the like, may also be injected into the composition during the injection molding process.

A foamed composition of the present invention may also be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful. Generally, either injection molding or compression molding may be used to form a layer or a core including a foamed polymeric material.

Other materials conventionally included in golf ball compositions may also be added to the compositions of the invention. These additional materials include, but are not limited to, reaction enhancers, crosslinking agents, optical brighteners, coloring agents, fluorescent agents, whitening agents, UV absorbers, hindered amine light stabilizers, defoaming agents, processing aids, mica, talc, nano-fillers, and other conventional additives. Antioxidants, stabilizers, softening agents, plasticizers, including internal and external plasticizers, impact modifiers, foaming agents, excipients, reinforcing materials and compatibilizers may also be added to any composition of the invention. In addition, heat stabilizers may be beneficial in enlarging the range of processing temperatures to greater than about 130° C. All of these materials, which are well known in the art, are added for their usual purpose in typical amounts.

Composition Blends

The highly neutralized ionomers of the present invention may also be blended with other polymers. For example, the highly neutralized ionomers may be blended with saponified polymers and graft copolymers of saponified polymers, such as those disclosed in U.S. Pat. No. 6,486,250, which is incorporated in its entirety by reference herein. In addition, the highly neutralized ionomers may be blended with oxa esters and oxa acids, such as those disclosed in U.S. Pat. No. 6,391,955, the disclosure of which is entirely incorporated by reference herein.

Other polymers that may be used in conjunction with the highly neutralized compositions of the invention include, but are not limited to: block copolymers of a poly(ether-ester), such as HYTREL® available from DuPont, block copolymers of a poly(ether-amide), such as PEBAX® available from Elf Atofina, styrene-butadiene-styrene block copolymers, such as the KRATON D® grades available from Kraton Polymers, styrene-(ethylene-propylene)-styrene or styrene-(ethylene-butylene)-styrene block copolymers, such as the KRATON G® series from Kraton Chemical, either of the KRATON®s with maleic anhydride or sulfonic graft or functionality, such as the KRATON FD® or KRATON FG® series available from Kraton Polymers, olefinic copolymers, such as the ethylene-acrylate or ethylene methacrylate series available from Quantum, metallocene catalyzed polymers, including ethylene-octene copolymers made from metallocene catalysts, available as the AFFINITY® or ENGAGE® series from Dow, and ethylene-alpha olefin copolymers and terpolymers made from metallocene catalysts, available as the EXACT® series from Exxon, block poly(urethane-ester) or block poly(urethane-ether) or block poly(urethane-caprolactone), such as the ESTANE® series available from Noveon Co., polyethylene glycol, such as CARBOWAX® available from Union Carbide, polycaprolactone, polycaprolactam, polyesters, such as EKTAR® available from Eastman, polyamides, such as nylon 6 or nylon 6,6, available from DuPont and ICI, ethylene-propylene-(diene monomer) terpolymers and their sulfonated or carboxylated derivatives, PP/EPDM and dynamically vulcanized rubbers, such as SANTOPRENE® from Monsanto, and FUSABOND® series materials available from DuPont. For example, the metallocene-catalyzed polymers disclosed in U.S. Pat. No. 6,414,082 are contemplated for use in conjunction with the neutralized compositions of the invention.

The amounts of polymers used to form highly neutralized ionomer blends may vary from about 1 to about 99 parts of the highly neutralized ionomer to about 99 to about 1 parts of other polymers, based on the total weight of the blend. In one embodiment, the highly neutralized ionomer is present in an amount of about 95 percent to about 5 percent with about 5 percent to about 95 percent of one or more other polymers making up the rest of the blend. In another embodiment, the highly neutralized ionomer is present in an amount of about 95 percent to about 10 percent by weight of the blend, and at least one other polymer is present in an amount of about 5 percent to about 90 percent by weight of the blend.

The highly neutralized ionomer blends may be prepared with or without the addition of a compatibilizer, and with varying molecular architecture of blend components, such as varying molecular weight, tacticity, and degrees of blockiness, as is well known to those knowledgeable in the art of blending polymers.

Golf Ball Construction

The highly neutralized ionomer compositions of the present invention may be used with any type of ball construction. For example, golf balls formed according to the invention may have a one-piece construction formed from a homogeneous mass consisting entirely of the composition of the invention. Such balls may further include, if desired, blends of conventional materials, such as those discussed herein. One-piece balls, formed with the compositions of the invention, are quite durable, but do not provide great distance because of relatively high spin and low velocity.

Thus, another aspect of the present invention relates to two-piece, three-piece, and four-piece designs, as well as to golf balls having a double core, a double cover, an intermediate layer(s), a multilayer core, and/or a multilayer cover depending on the type of performance desired of the ball. As used herein, the term "layer" includes any generally spherical portion of a golf ball, i.e., a golf ball core or center, an intermediate layer, and/or a golf ball cover. As used herein, the term "multilayer" means at least two layers.

Figure 2:
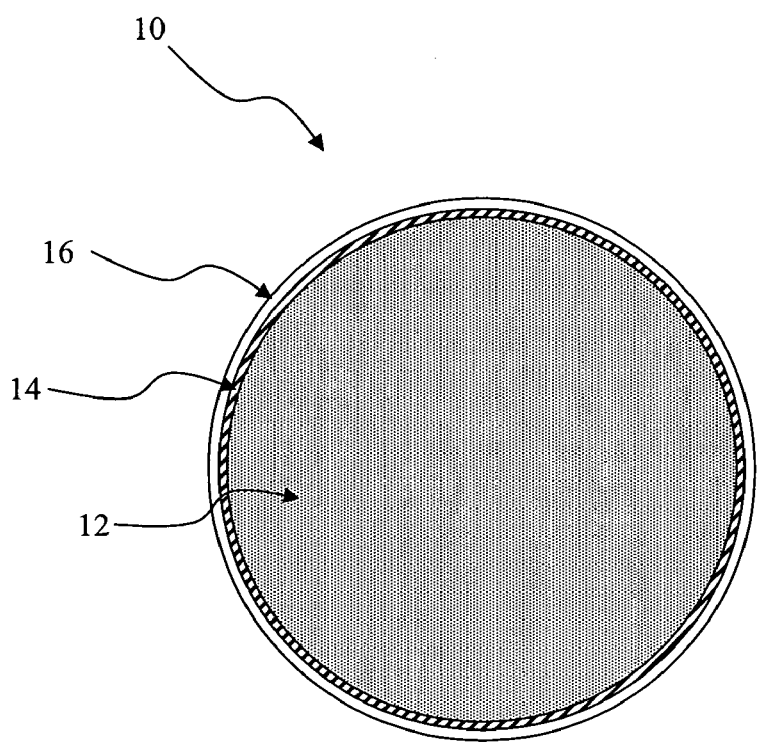
FIG. 2 is a cross-sectional view of a multi-component golf ball, wherein at least a portion of the golf ball is formed from the compositions of the invention.
Figure 3:
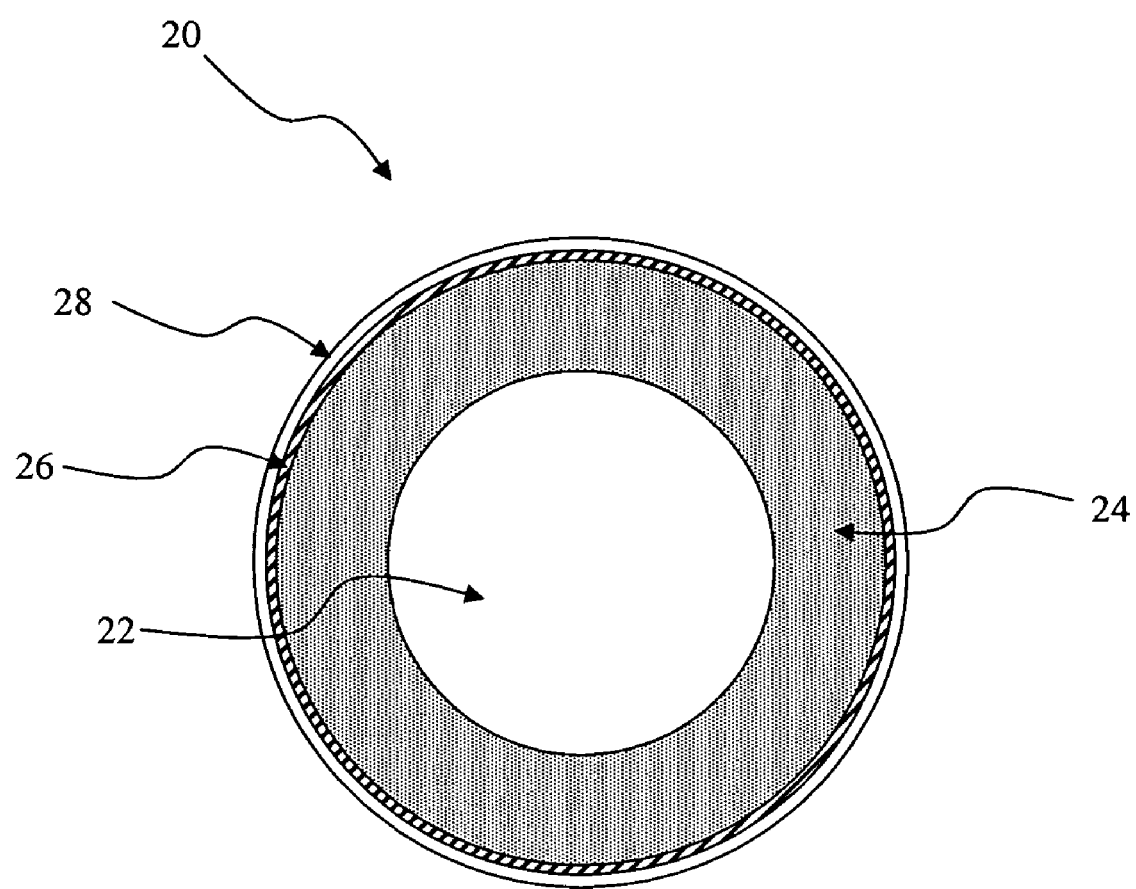
FIG. 3 is a cross-sectional view of a multi-component golf ball including a core, an outer core layer, a thin inner cover layer, and a thin outer cover layer disposed thereon, wherein at least a portion of the golf ball is formed from the compositions of the invention.

In one embodiment, a golf ball 2 according to the invention (as shown in FIG. 1) includes a core 4 and a cover 6, wherein at least one of core 4 and cover 6 incorporates at least one layer including the highly neutralized ionomer composition of the invention. Similarly, FIG. 2 illustrates a golf ball according to the invention incorporating an intermediate layer. Golf ball 10 includes a core 12, a cover 16, and an intermediate layer 14 disposed between the core 12 and cover 16. Any of the core 12, intermediate layer 14, or cover 16 may incorporate at least one layer that includes the highly neutralized composition of the invention. FIG. 3 illustrates a four-piece golf ball 20 according to the invention including a core 22, an outer core layer or intermediate layer 24, an inner cover layer or intermediate layer 26, and an outer cover layer 28.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US 2001/0009310 A1, US 2002/0025862, and US 2002/0028885. The entire disclosures of these patents and published patent applications are incorporated by reference herein.

As discussed, the golf balls of the invention include at least one layer that includes the highly neutralized ionomer compositions of the invention. In addition, as discussed below with specific reference the core, intermediate, and cover layers, the golf balls of the invention may include core layers, intermediate layers, or cover layers formed from materials known to those of skill in the art. These examples are not exhaustive, as skilled artisans would be aware that a variety of materials might be used to produce a golf ball of the invention with desired performance properties.

Core Layer(s)

The cores of the golf balls formed according to the invention may be solid, semi-solid, hollow, fluid-filled, or powder filled. As used herein, the term "core" means the innermost portion of a golf ball, and may include one or more layers. For example, U.S. Pat. Nos. 6,180,040 and 6,180,722 disclose methods of preparing dual core golf balls. The entire disclosures of these patents are incorporated by reference herein. The term "semi-solid" as used herein refers to a paste, a gel, or the like.

While the cores of the invention may be formed with the highly neutralized ionomer compositions of the invention, conventional materials may also be used to form the cores. Suitable core materials include, but are not limited to, thermoset materials, such as rubber, styrene butadiene, polybutadiene, isoprene, polyisoprene, trans-isoprene, and polyurethane, and thermoplastic materials, such as conventional ionomer resins, polyamides, polyesters, and polyurethane. In one embodiment, at least one layer of the core is formed from a polybutadiene reaction product, such as the reaction products disclosed in co-pending U.S. Patent Publication No. 2003/0119989, the entire disclosure of which is incorporated by reference herein.

For example, the core may include a reaction product material formed from the conversion reaction of sufficient amounts of polybutadiene, a free radical source, and a sufficient amount of cis-to-trans catalyst to provide an amount of trans-isomer greater than the amount of trans-isomer present before the conversion reaction, which reaction occurs at a sufficient temperature to form the material that contains trans-isomer and cis-isomer.

The free-radical source is typically a peroxide, and preferably an organic peroxide, which decomposes during the cure cycle. Suitable free-radical sources include organic peroxide compounds, such as di-t-amyl peroxide, di(2-t-butyl-peroxyisopropyl)benzene peroxide or .alpha.,.alpha.-bis (t-butylperoxy) diisopropylbenzene, 1,1-bis(t-butylperoxy)-3,3,5-trimethy-1cyclohexane or 1,1-di(t-butylperoxy) 3,3,5-trimethyl cyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and the like, and any mixture thereof.

The cis-to-trans catalyst may include an organosulfur compound, an inorganic sulfide, a Group VIA component, or a combination thereof. For instance, the cis-to-trans catalyst may be a halogenated organosulfur compound, such as pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol; 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts, the metal salts thereof, and mixtures thereof, but is preferably pentachlorothiophenol or the metal salt thereof. In one embodiment, the metal salt is zinc, calcium, potassium, magnesium, sodium, lithium, or mixtures thereof.

The core composition may also include a crosslinking agent to increase the hardness of the reaction product. Suitable crosslinking agents include one or more metallic salts of unsaturated fatty acids having 3 to 8 carbon atoms, such as acrylic or methacrylic acid, or monocarboxylic acids, such as zinc, calcium, or magnesium acrylate salts, and the like, and mixtures thereof. Examples include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof.

Additional materials may be included in the core layer compositions outlined above. For example, coloring agents, optical brighteners, crosslinking agents, whitening agents such as $TiO_2$ and ZnO, UV absorbers, hindered amine light stabilizers, defoaming agents, processing aids, surfactants, and other conventional additives may be added to the core layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the core layer compositions. One of ordinary skill in the art should be aware of the requisite amount for each type of additive to realize the benefits of that particular additive.

The core may also include one or more wound layers (surrounding a fluid or solid center) including at least one tensioned elastomeric material wound about the center. In one embodiment, the tensioned elastomeric material includes natural or synthetic elastomers or blends thereof. The synthetic elastomer preferably includes LYCRA. In another embodiment, the tensioned elastomeric material incorporates a polybutadiene reaction product as disclosed in co-pending U.S. patent application Ser. No. 10/190,705. In yet another embodiment, the tensioned elastomeric material may also be formed from conventional polyisoprene. In still another embodiment, a polyurea composition (as disclosed in co-pending U.S. patent application Ser. No. 10/228,311, filed Aug. 27, 2002, entitled "Golf Balls Comprising Light Stable Materials and Methods for Making Same," which is incorporated by reference in its entirety by reference herein) is used to form the tensioned elastomeric material. In another embodiment, solvent spun polyethers urea, as disclosed in U.S. Pat. No. 6,149,535, which is incorporated in its entirety by reference herein, is used to form the tensioned elastomeric material in an effort to achieve a smaller cross-sectional area with multiple strands.

The tensioned elastomeric layer may also be a high tensile filament having a tensile modulus of about 10,000 kpsi or greater, as disclosed in co-pending U.S. patent application Ser. Nos. 09/842,829 and 09/841,910, filed Apr. 27, 2001, entitled "All Rubber Golf Ball with Hoop-Stress Layer" and "MultiLayer Golf Ball With Hoop-Stress Layer," respectively, the entire disclosures of which are incorporated by reference herein.

Intermediate Layer(s)

As used herein, "intermediate layer" includes any layer between the innermost layer of the golf ball and the outermost layer of the golf ball. Therefore, intermediate layers may also be referred to as outer core layers, inner cover layers, and the like. When the golf ball of the present invention includes an intermediate layer, this layer may include any materials known to those of ordinary skill in the art, including various thermoset and thermoplastic materials, as well as blends thereof. For example, the intermediate layers of the golf ball of the invention may be formed with the highly neutralized compositions of the invention. The intermediate layer may likewise be formed, at least in part, from one or more homopolymeric or copolymeric materials, such as vinyl resins, polyolefins, polyurethanes, polyureas, polyamides, acrylic resins, olefinic thermoplastic rubbers, block copolymers of styrene and butadiene, isoprene or ethylene-butylene rubber, copoly(ether-amide), polyphenylene oxide resins, thermoplastic polyesters, ethylene, propylene, 1-butene or 1-hexene based homopolymers or copolymers, and the like.

The intermediate layer may also be formed from highly neutralized polymers such as those disclosed U.S. Patent Publication No. 2001/0018375 and 2001/0019971, which are incorporated herein in their entirety by express reference thereto; grafted and non-grafted metallocene catalyzed polyolefins and polyamides, polyamide/ionomer blends, and polyamide/nonionomer blends, such as those disclosed in U.S. patent application Ser. No. 10/138,304, filed May 6, 2002, entitled "Golf Ball Incorporating Grafted Metallocene Catalyzed Polymer Blends," which is incorporated by reference herein in its entirety; among other polymers. Examples of other suitable intermediate layer materials include blends of some of the above materials, such as those disclosed in U.S. Pat. No. 5,688,181, the entire disclosure of which is incorporated by reference herein.

Additional materials may be included in the intermediate layer compositions outlined above. For example, catalysts, coloring agents, optical brighteners, crosslinking agents, whitening agents such as $TiO_2$ and ZnO, UV absorbers, hindered amine light stabilizers, defoaming agents, processing aids, surfactants, and other conventional additives may be added to the intermediate layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the intermediate layer compositions. One of ordinary skill in the art should be aware of the requisite amount for each type of additive to realize the benefits of that particular additive.

The intermediate layer may also be formed of a binding material and an interstitial material distributed in the binding material, as discussed in U.S. patent application Ser. No. 10/028,826, filed Dec. 28, 2001, entitled, "Golf Ball with a Radially Oriented Transversely Isotropic Layer and Manufacture of Same," the entire disclosure of which is incorporated by reference herein. In addition, at least one intermediate layer may also be a moisture barrier layer, such as the ones described in U.S. Pat. No. 5,820,488, which is incorporated in its entirety by reference herein. The intermediate layer may also be formed from any of the polyurethane, polyurea, and polybutadiene materials discussed co-pending U.S. patent application Ser. No. 10/228,311.

Cover Layer(s)

The cover provides the interface between the ball and a club. As used herein, the term "cover" means the outermost portion of a golf ball. A cover typically includes at least one layer and may contain indentations such as dimples and/or ridges. Paints and/or laminates are typically disposed about the cover to protect the golf ball during use thereof. The cover may include a plurality of layers, e.g., an inner cover layer disposed about a golf ball center and an outer cover layer formed thereon.

Cover layers may be formed of the highly neutralized ionomer compositions of the invention, however, other cover materials known to those of skill in the art are also contemplated for use with the present invention. For example, the cover may be formed of polyurea, polyurethane, or mixtures thereof, as disclosed in co-pending U.S. Patent Publication Nos. 2003/0096936 and 2003/0212240. The entire disclosures of these applications are incorporated by reference herein.

In addition, cover layers may also be formed of one or more homopolymeric or copolymeric materials, such as vinyl resins, polyolefins, conventional polyurethanes and polyureas, such as the ones disclosed in U.S. Pat. Nos. 5,334,673, and 5,484,870, polyamides, acrylic resins and blends of these resins with poly vinyl chloride, elastomers, and the like, thermoplastic urethanes, olefinic thermplastic rubbers, block copolymers of styrene and butadiene, polyphenylene oxide resins or blends of polyphenylene oxide with high impact polystyrene, thermoplastic polyesters, ethylene, propylene, 1-butene or 1-hexane based homopolymers or copolymers including functional monomers, methyl acrylate, methyl methacrylate homopolymers and copolymers, low acid ionomers, high acid ionomers, alloys, and mixtures thereof. The cover may also be at least partially formed from the polybutadiene reaction product discussed above with respect to the core. In another embodiment, the cover is formed from balata, trans-polyisoprene, or a mixture thereof.

Additional materials may be included in the cover layer compositions outlined above. For example, catalysts, coloring agents, optical brighteners, crosslinking agents, whitening agents such as $TiO_2$ and ZnO, UV absorbers, hindered amine light stabilizers, defoaming agents, processing aids, surfactants, and other conventional additives may be added to the cover layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the cover layer compositions. Those of ordinary skill in the art should be aware of the requisite amount for each type of additive to realize the benefits of that particular additive.

In addition, while hardness gradients are typically used in a golf ball to achieve certain characteristics, the present invention also contemplates the compositions of the invention being used in a golf ball with multiple cover layers having essentially the same hardness, wherein at least one of the layers has been modified in some way to alter a property that affects the performance of the ball. Such ball constructions are disclosed in co-pending U.S. patent application Ser. No. 10/167,744, filed Jun. 13, 2002, entitled "Golf Ball with Multiple Cover Layers," the entire disclosure of which is incorporated by reference herein.

Methods for Forming

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. A method of injection molding using a split vent pin can be found in co-pending U.S. Patent Publication No. 2002/0079615. Examples of retractable pin injection molding may be found in U.S. Pat. Nos. 6,129,881, 6,235,230, and 6,379,138. These molding references are incorporated in their entirety by reference herein. In addition, a chilled chamber, i.e., a cooling jacket, such as the one disclosed in U.S. patent application Ser. No. 09/717,136, filed Nov. 22, 2000, entitled "Method of Making Golf Balls" may be used to cool the compositions of the invention when casting, which also allows for a higher loading of catalyst into the system.

One skilled in the art would appreciate that the molding method used may be determined at least partially by the properties of the composition. For example, casting, RIM, or LIM may be preferred when the material is thermoset, whereas compression molding or injection molding may be preferred for thermoplastic compositions. Compression molding, however, may also be used for thermoset inner ball materials. For example, when cores are formed from a thermoset material, compression molding is a particularly suitable method of forming the core, whereas when the cores are formed of a thermoplastic material, the cores may be injection molded. In addition, the intermediate layer may also be formed from using any suitable method known to those of ordinary skill in the art. For example, an intermediate layer may be formed by blow molding and covered with a dimpled cover layer formed by injection molding, compression molding, casting, vacuum forming, powder coating, and the like.

In addition, when covers are formed of polyurea and/or polyurethane compositions, these materials may be applied over an inner ball using a variety of application techniques such as spraying, compression molding, dipping, spin coating, casting, or flow coating methods that are well known in the art. Examples of forming polyurea and polyurethane materials about an inner ball are disclosed in U.S. Pat. Nos. 5,733,428, 5,006,297, and 5,334,673, which are incorporated by reference in their entirety herein. In one embodiment, a combination of casting and compression molding can be used to form a polyurethane or polyurea composition over an inner ball. However, the method of forming covers according to the invention is not limited to the use of these techniques; other methods known to those skilled in the art may also be employed.

Prior to forming the cover layer, the inner ball, i.e., the core and any intermediate layers disposed thereon, may be surface treated to increase the adhesion between the outer surface of the inner ball and the cover. Examples of such surface treatment may include mechanically or chemically abrading the outer surface of the subassembly. Additionally, the inner ball may be subjected to corona discharge, plasma treatment, and/or silane dipping prior to forming the cover around it. Other layers of the ball, e.g., the core, also may be surface treated. Examples of these and other surface treatment techniques can be found in U.S. Pat. No. 6,315,915, which is incorporated by reference in its entirety.

The methods discussed herein and other manufacturing methods for forming the golf ball components of the present invention are also disclosed in U.S. Pat. Nos. 6,207,784 and 5,484,870, the disclosures of which are incorporated herein by reference in their entirety.

Dimples

The golf balls of the invention are prefereably designed with certain flight characteristics in mind. The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Alternatively, the dimple pattern can be arranged according to phyllotactic patterns, such as described in U.S. Pat. No. 6,338,684, which is incorporated herein in its entirety.

Dimple patterns may also be based on Archimedean patterns including a truncated octahedron, a great rhombcuboctahedron, a truncated dodecahedron, and a great rhombicosidodecahedron, wherein the pattern has a non-linear parting line, as disclosed in U.S. patent application Ser. No. 10/078,417, which is incorporated in its entirety by reference herein. The golf balls of the present invention may also be covered with non-circular shaped dimples, i.e., amorphous shaped dimples, as disclosed in U.S. Pat. No. 6,409,615, which is incorporated in its entirety by reference herein.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. In one embodiment, the golf balls of the invention have a dimple coverage of the surface area of the cover of at least about 60 percent, preferably at least about 65 percent, and more preferably at least 70 percent or greater. Dimple patterns having even higher dimple coverage values may also be used with the present invention. Thus, the golf balls of the present invention may have a dimple coverage of at least about 75 percent or greater, about 80 percent or greater, or even about 85 percent or greater.

In addition, a tubular lattice pattern, such as the one disclosed in U.S. Pat. No. 6,290,615, which is incorporated by reference in its entirety herein, may also be used with golf balls of the present invention. The golf balls of the present invention may also have a plurality of pyramidal projections disposed on the intermediate layer of the ball, as disclosed in U.S. Pat. No. 6,383,092, which is incorporated in its entirety by reference herein. The plurality of pyramidal projections on the golf ball may cover between about 20 percent to about 80 of the surface of the intermediate layer.

In an alternative embodiment, the golf ball may have a non-planar parting line allowing for some of the plurality of pyramidal projections to be disposed about the equator. Such a golf ball may be fabricated using a mold as disclosed in U.S. patent application Ser. No. 09/442,845, filed Nov. 18, 1999, entitled "Mold For A Golf Ball," and which is incorporated in its entirety by reference herein. This embodiment allows for greater uniformity of the pyramidal projections.

Several additional non-limiting examples of dimple patterns with varying sizes of dimples are also provided in U.S. Pat. Nos. 6,358,161 and 6,213,898, the entire disclosures of which are incorporated by reference herein.

The total number of dimples on the ball, or dimple count, may vary depending such factors as the sizes of the dimples and the pattern selected. In general, the total number of dimples on the ball preferably is between about 100 to about 1000 dimples, although one skilled in the art would recognize that differing dimple counts within this range can significantly alter the flight performance of the ball. In one embodiment, the dimple count is about 380 dimples or greater, but more preferably is about 400 dimples or greater, and even more preferably is about 420 dimples or greater. In one embodiment, the dimple count on the ball is about 422 dimples. In some cases, it may be desirable to have fewer dimples on the ball. Thus, one embodiment of the present invention has a dimple count of about 380 dimples or less, and more preferably is about 350 dimples or less.

Dimple profiles revolving a catenary curve about its symmetrical axis may increase aerodynamic efficiency, provide a convenient way to alter the dimples to adjust ball performance without changing the dimple pattern, and result in uniformly increased flight distance for golfers of all swing speeds. Thus, catenary curve dimple profiles, as disclosed in U.S. patent application Ser. No. 09/989,191, filed Nov. 21, 2001, entitled "Golf Ball Dimples with a Catenary Curve Profile," which is incorporated in its entirety by reference herein, is contemplated for use with the golf balls of the present invention.

Golf Ball Post-Processing

The golf balls of the present invention may be painted, coated, or surface treated for further benefits. For example, a golf ball of the invention may be treated with a base resin paint composition or the cover composition may contain certain additives to achieve a desired color characteristic. In one embodiment, the golf ball cover composition contains a fluorescent whitening agent, e.g., 2,2'-(2,5-thiophenediyl)bis (5-tert-butylbenzoxazole), to provide improved weather resistance and brightness. An example of such a fluorescent whitening agent is disclosed in U.S. Patent Publication No. 2002/0082358, which is incorporated by reference herein in its entirety.

Protective and decorative coating materials, as well as methods of applying such materials to the surface of a golf ball cover are well known in the golf ball art. Generally, such coating materials comprise urethanes, urethane hybrids, epoxies, polyesters and acrylics. If desired, more than one coating layer can be used. The coating layer(s) may be applied by any suitable method known to those of ordinary skill in the art. For example, the coating layer(s) may be applied to the golf ball cover by an in-mold coating process, such as described in U.S. Pat. No. 5,849,168, which is incorporated in its entirety by reference herein. In addition, the golf balls of the invention may be painted or coated with an ultraviolet curable/treatable ink, by using the methods and materials disclosed in U.S. Pat. Nos. 6,500,495, 6,248,804, and 6,099,415, the entire disclosures of which are incorporated by reference herein.

In addition, trademarks or other indicia may be stamped, i.e., pad-printed, on the outer surface of the ball cover, and the stamped outer surface is then treated with at least one clear coat to give the ball a glossy finish and protect the indicia stamped on the cover.

The golf balls of the invention may also be subjected to dye sublimation, wherein at least one golf ball component is subjected to at least one sublimating ink that migrates at a depth into the outer surface and forms an indicia. The at least one sublimating ink preferably includes at least one of an azo dye, a nitroarylamine dye, or an anthraquinone dye. U.S. Patent Publication No. 2003/0106442, the entire disclosure of which is incorporated by reference herein.

Laser marking of a selected surface portion of a golf ball causing the laser light-irradiated portion to change color is also contemplated for use with the present invention. U.S. Pat. Nos. 5,248,878 and 6,075,223 generally disclose such methods, the entire disclosures of which are incorporated by reference herein. In addition, the golf balls may be subjected to ablation, i.e., directing a beam of laser radiation onto a portion of the cover, irradiating the cover portion, wherein the irradiated cover portion is ablated to form a detectable mark, wherein no significant discoloration of the cover portion results therefrom. Ablation is discussed in U.S. Pat. No. 6,462,303, which is incorporated in its entirety by reference herein.

Golf Ball Properties

The properties such as hardness, modulus, core diameter, intermediate layer thickness and cover layer thickness of the golf balls of the present invention have been found to effect play characteristics such as spin, initial velocity and feel of the present golf balls. For example, the flexural and/or tensile modulus of the intermediate layer are believed to have an effect on the "feel" of the golf balls of the present invention. It should be understood that the ranges herein are meant to be intermixed with each other, i.e., the low end of one range may be combined with a high end of another range.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from 1.7 to about 1.95 inches can be used. Preferably, the overall diameter of the core and all intermediate layers is about 80 percent to about 98 percent of the overall diameter of the finished ball.

The core may have a diameter ranging from about 0.09 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches. For example, the core may have a diameter of about 1.585 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.54 inches or greater, preferably about 1.55 inches or greater. In one embodiment, the core diameter is about 1.59 inches or greater. In another embodiment, the diameter of the core is about 1.64 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.35 inches. The cover preferably has a thickness of about 0.02 inches to about 0.12 inches, preferably about 0.1 inches or less. When the compositions of the invention are used to form the outer cover of a golf ball, the cover may have a thickness of about 0.1 inches or less, preferably about 0.07 inches or less. In one embodiment, the outer cover has a thickness from about 0.02 inches to about 0.07 inches. In another embodiment, the cover thickness is about 0.05 inches or less, preferably from about 0.02 inches to about 0.05 inches. In yet another embodiment, the outer cover layer of such a golf ball is between about 0.02 inches and about 0.045 inches. In still another embodiment, the outer cover layer is about 0.025 to about 0.04 inches thick. In one embodiment, the outer cover layer is about 0.03 inches thick.

In a golf ball having a relatively large core, e.g., about 1.55 inches to about 1.63 inches, the cover may have a thickness of about 0.02 inches to about 0.06 inches, preferably about 0.03 inches to about 0.05 inches. In one embodiment, the golf ball has a core with a diameter of about 1.56 inches to about 1.60 inches and a cover layer with a thickness of about 0.045 inches to about 0.050 inches. In another embodiment, the core has a diameter of about 1.58 inches to about 1.59 inches and a cover with a thickness of about 0.048 inches to about 0.050 inches. For example, a suitable golf ball construction according to the invention may include a core of about 1.585 inches and a cover having a thickness of about 0.049 inches. These dimensions are also suitable for a golf ball having dual core and dual cover layers, e.g., a center of soft polybutadiene, an outer core layer of a high performance polymer, an ionomer inner cover layer, and a soft urethane outer cover.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less. The core and intermediate layer(s) together form an inner ball preferably having a diameter of about 1.48 inches or greater for a 1.68-inch ball. In one embodiment, the inner ball of a 1.68-inch ball has a diameter of about 1.52 inches or greater. In another embodiment, the inner ball of a 1.68-inch ball has a diameter of about 1.66 inches or less. In yet another embodiment, a 1.72-inch (or more) ball has an inner ball diameter of about 1.50 inches or greater. In still another embodiment, the diameter of the inner ball for a 1.72-inch ball is about 1.70 inches or less.

Hardness

Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater.

When the intermediate layer is intended to be harder than the core layer, the ratio of the intermediate layer hardness to the core hardness preferably about 2 or less. In one embodiment, the ratio is about 1.8 or less. In yet another embodiment, the ratio is about 1.3 or less.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore D to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In this embodiment when the outer cover layer is softer than the intermediate layer or inner cover layer, the ratio of the Shore D hardness of the outer cover material to the intermediate layer material is about 0.8 or less, preferably about 0.75 or less, and more preferably about 0.7 or less. In another embodiment, the ratio is about 0.5 or less, preferably about 0.45 or less.

In yet another embodiment, the ratio is about 0.1 or less when the cover and intermediate layer materials have hardnesses that are substantially the same. When the hardness differential between the cover layer and the intermediate layer is not intended to be as significant, the cover may have a hardness of about 55 Shore D to about 65 Shore D. In this embodiment, the ratio of the Shore D hardness of the outer cover to the intermediate layer is about 1.0 or less, preferably about 0.9 or less.

The cover hardness may also be defined in terms of Shore C. For example, the cover may have a hardness of about 70 Shore C or greater, preferably about 80 Shore C or greater. In another embodiment, the cover has a hardness of about 95 Shore C or less, preferably about 90 Shore C or less.

In another embodiment, the cover layer is harder than the intermediate layer. In this design, the ratio of Shore D hardness of the cover layer to the intermediate layer is about 1.33 or less, preferably from about 1.14 or less.

When a two-piece ball is constructed, the core may be softer than the outer cover. For example, the core hardness may range from about 30 Shore D to about 50 Shore D, and the cover hardness may be from about 50 Shore D to about 80 Shore D. In this type of construction, the ratio between the cover hardness and the core hardness is preferably about 1.75 or less. In another embodiment, the ratio is about 1.55 or less. Depending on the materials, for example, if a composition of the invention is acid-functionalized wherein the acid groups are at least partially neutralized, the hardness ratio of the cover to core is preferably about 1.25 or less.

Compression

Compression values are dependent on the diameter of the component being measured. Atti compression is typically used to measure the compression of a golf ball. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J.

The Atti compression of the core, or portion of the core, of golf balls prepared according to the invention is preferably less than about 80, more preferably less than about 75. In another embodiment, the core compression is from about 40 to about 80, preferably from about 50 to about 70. For example, the core compression may be about 40 to about 50. In yet another embodiment, the core compression is preferably below about 50, and more preferably below about 25. In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 60 to 100. In yet another embodiment, the compression of the golf balls of the invention is about 75 or greater and about 95 or less. For example, a preferred golf ball of the invention may have a compression from about 80 to about 95, preferably about 80 to about 90. In one embodiment, the compression of a golf ball of the invention is about 87.

Initial Velocity and COR

There is currently no USGA limit on the coefficient of restitution (COR) of a golf ball, but current U.S.G.A. rules state that the initial velocity of the golf ball cannot exceed 250±5 feet/second (ft/s) under U.S.G.A. established testing conditions. It is preferred that golf balls of the invention satisfy initial velocity requirements of the U.S.G.A. Thus, in one embodiment, the initial velocity is about 245 ft/s or greater and about 255 ft/s or less. In another embodiment, the initial velocity is about 250 ft/s or greater, but still complies with the U.S.G.A. initial velocity requirements. In one embodiment, the initial velocity is about 253 ft/s to about 254 ft/s. In yet another embodiment, the initial velocity is about 255 ft/s. While the current rules on initial velocity require that golf ball manufacturers stay within the limits stated above, one of ordinary skill in the art would appreciate that golf balls of the invention may be designed with initial velocities outside of this range. For example, a golf ball of the invention may be designed to have an initial velocity of about 220 ft/s or greater, preferably about 225 ft/s or greater.

As a result, of the initial velocity limitation set forth by the USGA, it may be desirable to maximize COR without violating the 255 ft/s limit. The COR of a ball is measured by taking the ratio of the outbound or rebound velocity to the incoming or inbound velocity. In a one-piece solid golf ball, the COR will depend on a variety of characteristics of the ball, including its composition and hardness. For a given composition, COR will generally increase as hardness is increased. In some two-piece solid golf balls, e.g., those having a core and a cover, the cover may be designed to produce a gain in COR over that of the core. When the contribution of the core to COR is substantial, a lesser contribution is required from the cover. Moreover, core compositions having a high COR may have covers around them that slow the ball or deaden its response to club impact. Similarly, when the cover contributes substantially to high COR of the ball, a lesser contribution is needed from the core.

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

In addition, the inner ball preferably has a COR of about 0.780 or more. In one embodiment, the COR is about 0.790 or greater.

Spin Rate

As known to those of ordinary skill in the art, the spin rate of a golf ball will vary depending on the golf ball construction. In a multilayer ball, e.g., a core, an intermediate layer, and a cover, wherein the cover is formed from the compositions of the invention, the spin rate of the ball off a driver ("driver spin rate") may be about 2700 rpm or greater. In one embodiment, the driver spin rate is about 2800 rpm to about 3500 rpm. In another embodiment, the driver spin rate is about 2900 rpm to about 3400 rpm. In still another embodiment, the driver spin rate may be less than about 2700 rpm.

Two-piece balls made according to the invention may also have driver spin rates of 2700 rpm and greater. In one embodiment, the driver spin rate is about 2700 rpm to about 3300 rpm. Wound balls made according to the invention preferably have similar spin rates.

Methods of determining the spin rate should be well understood by those of ordinary skill in the art. Examples of methods for determining the spin rate are disclosed in U.S. Pat. Nos. 6,500,073, 6,488,591, 6,286,364, and 6,241,622, which are incorporated by reference herein in their entirety.

Flexural Modulus

Accordingly, it is preferable that the golf balls of the present invention have an intermediate layer with a flexural modulus, as measured by ASTM D6272-02, of about 500 psi to about 500,000 psi. More preferably, the flexural modulus of the intermediate layer is about 1,000 psi to about 250,000 psi. Most preferably, the flexural modulus of the intermediate layer is about 2,000 psi to about 200,000 psi.

The flexural modulus of the cover layer is preferably about 2,000 psi or greater, and more preferably about 5,000 psi or greater. In one embodiment, the flexural modulus of the cover is from about 10,000 psi to about 150,000 psi. More preferably, the flexural modulus of the cover layer is about 15,000 psi to about 120,000 psi. Most preferably, the flexural modulus of the cover layer is about 18,000 psi to about 110,000 psi. In another embodiment, the flexural modulus of the cover layer is about 100,000 psi or less, preferably about 80,000 or less, and more preferably about 70,000 psi or less. For example, the flexural modulus of the cover layer may be from about 10,000 psi to about 70,000 psi, from about 12,000 psi to about 60,000 psi, or from about 14,000 psi to about 50,000 psi.

In one embodiment, when the cover layer has a hardness of about 50 Shore D to about 60 Shore D, the cover layer preferably has a flexural modulus of about 55,000 psi to about 65,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

Specific Gravity

The specific gravity, as measured by ASTM D297, of a cover or intermediate layer is preferably at least about 0.7. In one embodiment, the specific gravity of the intermediate layer or cover is about 0.8 or greater, preferably about 0.9 or greater. For example, in one embodiment, the golf ball has an intermediate layer with a specific gravity of about 0.9 or greater and a cover having a specific gravity of about 0.95 or greater. In another embodiment, the intermediate layer or cover has a specific gravity of about 1.00 or greater. In yet another embodiment, the specific gravity of the intermediate layer or cover is about 1.05 or greater, preferably about 1.10 or greater.

The core may have a specific gravity of about 1.00 or greater, preferably 1.05 or greater. For example, a golf ball of the invention may have a core with a specific gravity of about 1.10 or greater and a cover with a specific gravity of about 0.95 or greater.

Density

The density of a core is preferably about 0.6 g/cm$^3$ to about 10 g/cm$^3$. In one embodiment, the density of the core is about 0.9 g/cm$^3$ to about 8 g/cm$^3$. In another embodiment, the core density is about 2 g/cm$^3$ to about 6 g/cm$^3$. If present, the outer core preferably has a density of about 0.6 g/cm$^3$ to about 5 g/cm$^3$, more preferably about 0.9 g/cm$^3$ to about 3 g/cm$^3$. Likewise, the density of the inner cover cover layer is preferably about 0.6 g/cm$^3$ to about 5 g/cm$^3$, more preferably about 0.9 g/cm$^3$ to about 3 g/cm$^3$. The outer cover layer of a golf ball of the invention preferably has a density of about 0.9 g/cm$^3$ to about 1.55 g/cm$^3$, more preferably about 0.95 g/cm$^3$ to about 1.2 g/cm$^3$.

Adhesion Strength

With respect to layer to layer adhesion, the adhesions strength (or peel strength) of the compositions of the invention is preferably about 5 lb/in or greater. In one embodiment, the adhesion strength is about 25 lb/in or less. For example, the adhesion strength is preferably about 10 lb/in or more and about 20 lb/in or less. In another embodiment, the adhesion strength is about 20 lb/in or greater, preferably about 24 lb/in or greater. In yet another embodiment, the adhesion strength is about 26 lb/in or greater. In still another embodiment, the adhesion strength is about 20 lb/in to about 30 lb/in.

Skilled artisans are aware of methods to determine adhesion strength. For example, when testing adhesion strength of paint, cross-hatch tests and repeated ball impact tests are useful to determine the adhesion strength of a particular layer of a golf ball. The cross-hatch test consists of cutting the material into small pieces in mutually perpendicular directions, applying a piece of adhesive cellophane tape over the material, rapidly pulling off the tape, and counting the number of pieces removed. The repeated impact test consists of subjecting the finished golf ball to impact repeatedly and visually examining the coating film for peeling from the golf ball. Examples of these methods are provided in U.S. Pat. No. 5,316,730, which is incorporated by reference herein. The peel strength is measured using, a MTS Sintech® 30/G ) or MTS Sintech® 5/G) mechanical test e quipment to pull a 0.5-inch-wide section of a golf ball layer apart from the layer/core it is adheared to. The MTS includes a load cell of 100 N and a crosshead speed of 1.0 in/min. The golf ball is rotatedly secured in a manner such that a free rotation remains about a single axis perpendicular to the pull direction. Golf ball movement in other axes is not permitted.

Other than in the operating examples discussed below, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

EXAMPLES

The following non-limiting examples are merely illustrative of the preferred embodiments of the present invention, and are not to be construed as limiting the invention, the scope of which is defined by the appended claims. Parts are by weight unless otherwise indicated.

Example 1

Fully Neutralized Ammonium-Based Ionomer

A fully neutralized ammonium-based ionomer composition was made according to the invention with the formulation provided in Table 1:

TABLE 1

COMPOSITION AND PROPERTIES

|  |  | BASE RESIN | INVENTION |
|---|---|---|---|
| Nucrel ® 2940[1] |  | 10 g | 10 g |
| Tetramethylammonium hydroxide |  | — | 2 g |
| FTIR | Acid Intensity | 0.8 | 0.0 |
| (Absorbance[2]) | Carboxylate Intensity | 0.0 | 0.75 |
| Thermal - | $T_m$ (° C.) | 82 | 83 |
| DSC | $T_c$ (° C.) | 54 | 47 |
| Stable (<130° C.) |  | Yes | Yes |
| MFI (@132.5° C., 2.16 kg) |  | 25 g/10 min. | 2.3 |

[1]copolymer of ethylene and 19 percent methacrylic acid (available from DuPont) dissolved in 100 ml of xylene
[2]intensity relative to CH absorbance at about 2850 cm$^{-1}$.

As shown above in Table 1, the formulation of the invention, which was fully neutralized as shown by the acid intensity value of 0.0, was stable, and flowed well at temperatures below 130° C. This would not be true of a metal fully neutralized polymer, and has only been achieved in the prior art through the addition of metal salts of fatty acids, which are known to discolor the polymer and potentially bloom or delaminate.

Example 2

Melt Flow and Degree of Neutralization for Neutralized Compositions

As shown below in Table 2, compositions of the invention neutralized with an ammonium-based component had the following properties:

TABLE 2

PROPERTIES OF NEUTRALIZED COMPOSITIONS

|  | Neutralized with Ammonium-Based Component of the Invention | Commercially available Highly Neutralized Polymers with Organic Fatty Acids and their salts | Commercially available Material without Organic Fatty Acid and their salts |
|---|---|---|---|
| Melt Flow (g/10 min) | 2.3 | 0.65 | 0.9 |
| Degree of Neutralization | 100 | 100 | 55 |

TABLE 2-continued

PROPERTIES OF NEUTRALIZED COMPOSITIONS

|  | Neutralized with Ammonium-Based Component of the Invention | Commercially available Highly Neutralized Polymers with Organic Fatty Acids and their salts | Commercially available Material without Organic Fatty Acid and their salts |
|---|---|---|---|
| Flexural Modulus (ksi) (%) | 30–45* | 31 | 54 |

*estimated value

Example 3

Two-Piece Ball (a Core and a Cover)

Two-piece golf balls that could be made according to the invention may have properties as set forth in Table 3 wherein the cover layer is formed of the invention.

TABLE 3

|  | Prophetic Example using an Ammonium Neutralized Polymer as a cover layer | Comparative Example Using Surlyn ® 6910 as a cover layer |
|---|---|---|
| Core Properties: |  |  |
| Diameter (inches) | 1.590 | 1.590 |
| Compression | 70 | 70 |
| Outer surface Hardness (Shore D) | 45 | 45 |
| CoR at 125 ft/sec | 0.810 | 0.810 |
| Cover Material Properties |  |  |
| Flexural Modulus (kpsi) | 40 | 54 |
| Hardness (Shore D) | 51 | 63 |
| Ball Properties |  |  |
| Compression | 82 | 90 |
| CoR at 125 ft/sec | 0.820 | 0.815 |

Example 4

Multi-layer Golf Balls Made According to the Invention

Multilayer golf balls that could be made according to the invention may have properties as set forth in Tables 4 and 5. Table 4 shows a three-piece ball an inner cover layer formed of the neutralized compositions of the invention whereas the Table 5 shows an example of a four-piece ball having outer core layers formed of the neutralized compositions of the invention.

TABLE 4

THREE-PIECE BALL (CORE, INTERMEDIATE LAYER, AND COVER)

|  | Prophetic Example using a present invention of Ammonium Neutralized Polymer as an inner cover layer | Comparative Example Using a conventional Ionomer Surlyn ® 6910 as an innner cover layer |
|---|---|---|
| Core Composition & Properties: | Thermoset BR | Thermoset BR |
| Diameter (inches) | 1.38 | 1.38 |
| Compression | 60 | 60 |
| CoR at 125 ft/sec | 0.794 | 0.794 |
| Specific gravity | 1.116 | 1.116 |
| Outer surface Hardness (Shore C) | 81 | 81 |
| Inner Cover layer Properties |  |  |
| Thickenss (inches) | 0.096 | 0.096 |
| Compression | 83 | 92 |
| CoR at 125 ft/sec | 0.806 | 0.798 |
| Surface Hardness (Shore D) | 55 | 62 |
| Outer Cover Composition | Butadiene/Balata blend (cured with ZDA) | Butadiene/Balata blend (cured with ZDA) |
| Ball Properties |  |  |
| Hardness (Shore D) | 52 | 58 |
| Compression | 86 | 95 |
| CoR at 125 ft/sec | 0.804 | 0.796 |

TABLE 5

FOUR-PIECE BALL (INNER CORE, OUTER CORE, INNER COVER, OUTER COVER)

|  | Prophetic Example using a present invention of Ammonium Neutralized Polymer as an outer core layer | Comparative Example Using a Surlyn ® HPF 2000 Ionomer as an outer core layer |
|---|---|---|
| Center Composition & Properties: | Thermoset BR | Thermoset BR |
| Diameter (inches) | 1.131 | 1.131 |
| Compression | 55 | 55 |
| CoR at 125 ft/sec | 0.787 | 0.787 |
| Specific gravity | 1.126 | 1.126 |
| Outer surface Hardness (Shore C) | 84 | 84 |
| Outer Core layer Properties |  |  |
| Thickenss (inches) | 0.133 | 0.133 |
| Compression | 72 | 77 |
| CoR at 125 ft/sec | 0.815 | 0.809 |
| Surface Hardness (Shore D) | 51 | 54 |
| Inner Cover Composition and Properties | Ionomer (Na/Mg/Zn ionomer) | Ionomer (Na/Mg/Zn ionomer) |
| Thickenss (inches) | 0.032 | 0.032 |
| Compression | 83 | 88 |
| CoR at 125 ft/sec | 0.825 | 0.819 |
| Surface Hardness (Shore D) | 65 | 65 |
| Outer Cover Composition | Butadiene/Balata blend (cured with ZDA) | Butadiene/Balata blend (cured with ZDA) |
| Ball Properties |  |  |
| Hardness (Shore D) | 55 | 55 |
| Compression | 94 | 99 |
| CoR at 125 ft/sec | 0.823 | 0.816 |

While it is apparent that the invention explicitly disclosed herein can be used to form neutralized compositions not previously known to those of skill in the art, it will be appreciated that numerous modifications and embodiments may be devised by those skilled in the art. For example, while golf balls and golf ball components are used as examples for articles incorporating the compositions of the invention, other golf equipment may be formed from the compositions of the invention. In one embodiment, at least a portion of a golf shoe is formed from the composition of the invention. In another embodiment, the composition of the invention is used to form at least a portion of a golf club, e.g., a putter insert. Therefore, it is intended that the appended claims cover all such modifications and embodiments that fall within the true spirit and scope of the present invention.

We claim:

1. A golf ball comprising at least one layer having a composition comprising:
   a thermoplastic resin component having an acid group and a neutralizing component selected from the group consisting of primary, secondary, or tertiary ammonium-based compounds wherein the acid group is highly neutralized, and wherein the thermoplastic resin component is a copolymer of ethylene and acrylic acid or methacrylic acid.

2. The golf ball of claim 1, wherein the golf ball has a core having an outer diameter of about 1.51 inches or greater.

3. The golf ball of claim 1, wherein at least about 90 percent or greater of the acid group is neutralized.

4. The golf ball of claim 3, wherein about 100 percent of the acid functionalized moiety is neutralized.

5. The golf ball of claim 1, wherein the core comprises an inner core layer and an outer core layer, wherein the inner core layer has a diameter of from about 0.5 inches to about 1.2 inches, and wherein the outer core layer has a thickness from about 0.1 inches to about 0.59 inches.

6. The golf ball of claim 2, wherein the golf ball has an intermediate layer and a cover, wherein the intermediate layer is from about 0.01 to about 0.1 inches thick and the cover is about 0.07 inches thick or less.

7. The golf ball of claim 6, wherein at least about 90 percent or greater of the acid group is neutralized.

8. The golf ball of claim 7, wherein about 100 percent of the acid group is neutralized.

9. The golf ball of claim 5, wherein the golf ball has an intermediate layer and a cover, wherein the intermediate layer is from about 0.01 to about 0.1 inches thick and the cover is about 0.07 inches thick or less.

10. The golf ball of claim 1, wherein about 10 percent or greater of the acid group is neutralized by the neutralizing component.

11. The golf ball of claim 10, wherein the acid group also is at least partially neutralized with a metal ion.

12. The golf ball of claim 1, wherein the composition is blended with a polymer.

13. The golf ball of claim 12, wherein the polymer comprises saponified polymers, graft copolymers of saponified polymers, oxa esters and oxa acids, block copolymers of a poly(ether-ester), block copolymers of a poly(ether-amide), styrene-butadiene-styrene block copolymers, styrene-(ethylene-propylene)-styrene or styrene-(ethylene-butylene)-styrene block copolymers, olefinic copolymers, metallocene catalyzed polymers, ethylene-alpha olefin copolymers, terpolymers made from metallocene catalysts, block poly(urethane-ester) or block poly(urethane-ether) or block poly(urethane-caprolactone), polyethylene glycol, polycaprolactone, polycaprolactam, polyesters, polyamides, ethylene-propylene-(diene monomer) terpolymers and their sulfonated or carboxylated derivatives, PP/EPDM, dynamically vulcanized rubbers, or mixtures thereof.

14. The golf ball of claim 12, wherein the composition forms about 25% or greater of the blended composition and polymer.

15. The golf ball of claim 14, wherein the composition forms about 50% or greater of the blended composition and polymer.

16. The golf ball of claim 15, wherein the composition forms about 75% or greater of the blended composition and polymer.

17. The golf ball of claim 12, wherein the polymer is thermoplastic.

18. The golf ball of claim 10, wherein about 30 percent or greater of the acid group is neutralized by the neutralizing component.

19. The golf ball of claim 18, wherein about 50 percent or greater of the acid group is neutralized by the neutralizing component.

20. The golf ball of claim 19, wherein about 80 percent or greater of the acid group is neutralized by the neutralizing component.

21. The golf ball of claim 20, wherein about 90 percent or greater of the acid group is neutralized by the neutralizing component.

22. The golf ball of claim 1, wherein at least about 80 percent or greater of the acid group is neutralized.

23. A golf ball comprising a core and a cover, wherein at least one of the core and the cover is formed of a composition comprising:
a thermoplastic resin component having an acid group, wherein the thermoplastic resin component is a copolymer of ethylene and acrylic acid or methacrylic acid; and
a neutralizing component comprising an ammonium salt, wherein acid group is neutralized about 90 percent or greater.

24. The golf ball of claim 23, wherein about 100 percent of the acid group is neutralized.

25. The golf ball of claim 23, wherein the ammonium salt comprises at least one quaternary ammonium compound.

26. The golf ball of claim 25, wherein the at least one quaternary ammonium compound comprises tetraalkylammonium hydroxides.

27. The golf ball of claim 26, wherein the quaternary ammonium compound comprises tetramethylammonium hydroxide.

28. The golf ball of claim 23, wherein the neutralizing component comprises ammonium hydroxide.

29. The golf ball of claim 23, wherein the acid group is present in an amount of about 5 percent to about 35 percent by weight of the thermoplastic resin component.

30. The golf ball of claim 23, wherein the acid group is present in an amount of about 8 percent to about 25 percent by weight of the thermoplastic resin component.

31. A golf ball comprising:
a core;
a cover; and
an intermediate layer disposed between the core and the cover, wherein the intermediate layer comprises:
a thermoplastic resin component having an acid group, wherein the thermoplastic resin component is a copolymer of ethylene and acrylic acid or methacrylic acid; and
a neutralizing component selected from the group consisting of primary, secondary, or tertiary ammonium-based compounds, an ammonium salt, and mixtures thereof, wherein the acid group is neutralized to an amount of about 90 percent or greater.

32. The golf ball of claim 31, wherein the acid group is about 100 percent neutralized.

33. The golf ball of claim 31, wherein the intermediate layer has a flexural modulus of about 5,000 psi to about 100,000 psi.

34. The golf ball of claim 31, wherein the intermediate layer has a flexural modulus of about 25,000 psi to about 75,000 psi.

35. The golf ball of claim 31, wherein the intermediate layer has a hardness of about 30 Shore D to about 70 Shore D.

36. The golf ball of claim 31, wherein the cover comprises a polyurethane, a polyurea, or a mixture thereof.

37. The golf ball of claim 31, wherein the cover comprises a thermoplastic material.

* * * * *